US012495375B2

(12) United States Patent
Wang et al.

(10) Patent No.: US 12,495,375 B2
(45) Date of Patent: Dec. 9, 2025

(54) FREQUENCY DOMAIN OFFSET METHOD AND APPARATUS

(71) Applicant: HUAWEI TECHNOLOGIES CO., LTD., Guangdong (CN)

(72) Inventors: Kun Wang, Shenzhen (CN); Xia Xiong, Shanghai (CN); Xin Tang, Shanghai (CN); Jini Wen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 338 days.

(21) Appl. No.: 18/317,114

(22) Filed: May 15, 2023

(65) Prior Publication Data

US 2023/0284164 A1 Sep. 7, 2023

Related U.S. Application Data

(63) Continuation of application No. PCT/CN2021/127294, filed on Oct. 29, 2021.

(30) Foreign Application Priority Data

Nov. 16, 2020 (CN) .......................... 202011281358.8

(51) Int. Cl.
*H04W 56/00* (2009.01)
(52) U.S. Cl.
CPC ................................ *H04W 56/004* (2013.01)
(58) Field of Classification Search
CPC ............ H04W 56/004; H04W 56/0015; H04L 25/0202; H04L 25/0224; H04L 25/025;
(Continued)

(56) References Cited

U.S. PATENT DOCUMENTS

2016/0259062 A1* 9/2016 Raghupathy ............ G01S 19/48
2017/0353938 A1* 12/2017 Nilsson ............. H04W 56/0005
(Continued)

FOREIGN PATENT DOCUMENTS

| CN | 109714092 A | 5/2019 |
|---|---|---|
| CN | 109802796 A | 5/2019 |

(Continued)

OTHER PUBLICATIONS 11-20-0033-01-00be-coordinated-spatial-reuse-operation.IEEE 802.11-19/1534r1 Sep. 2019,total 15 pages.
(Continued)

*Primary Examiner* — Ian N Moore
*Assistant Examiner* — Latresa A Mccallum

(57) ABSTRACT

This application provides a signal transmission method and apparatus. The method includes: A collaboration device receives a synchronization trigger frame delivered by a central device; the collaboration device obtains information about a time domain offset and/or information about a frequency domain offset; and the collaboration device sends a signal based on the synchronization trigger frame and the information about the time domain offset and/or the information about the frequency domain offset by using a corresponding time domain resource and a corresponding frequency domain resource. In this way, a plurality of collaboration devices send different time domain resources and/or frequency domain resources to a same terminal, and an interfering signal in channel estimation can be removed. This improves precision of the channel estimation and noise estimation at a receiving end, and improves demodulation performance at the receiving end and entire-network throughput.

9 Claims, 10 Drawing Sheets

(58) Field of Classification Search
CPC .............. H04L 25/033; H04L 27/0014; H04L 27/2657; H04L 27/2662; H04L 27/2675; H04L 2027/0026; H04L 5/0023
See application file for complete search history.

(56) References Cited

U.S. PATENT DOCUMENTS

| | | |
|---|---|---|
| 2018/0205434 A1 | 7/2018 | Cherian et al. |
| 2020/0045560 A1 | 2/2020 | Vermani et al. |
| 2023/0208585 A1* | 6/2023 | Yuan .................... H04L 5/0094 370/329 |

FOREIGN PATENT DOCUMENTS

| | | | |
|---|---|---|---|
| WO | 2018125355 A1 | 7/2018 | |
| WO | WO-2019120558 A1 * | 6/2019 | ........ H04W 56/0015 |
| WO | 2020097444 A1 | 5/2020 | |

OTHER PUBLICATIONS 11-19-1534-01-00be-coordinated-spatial-reuse-performance-analysis. pptx IEEE 802.11-19/1534r1 Sep. 2019,total 15 pages.
11-19-0927-00-00be-coordinated-transmission-scheme-for-11be. pptx, IEEE 802.11-19/927r0,May 2019,total 8 pages.
11-19-1779-06-00be-downlink-spatial-reuse-parameter-framework-with-coordinated-beamforming-null-steering-for-802-11be.pptx, IEEE 802.11-19/1779r6,Nov. 2019,total 12 pages.
11-20-0073-00-00be-on-coordinated-spatial-reuse-in-11be.pptx, IEEE 802.11-20/0073r0,Nov. 2019,total 13 pages.
11-20-0091-07-00be-performance-of-parameterized-spatial-reuse-psr-with-coordinated-beamforming-null-steering-for-802-11be. pptx, IEEE 802.11-20/0091r7,Mar. 2020,total 19 pages.
11-20-0107-01-00be-multi-ap-coordination-for-spatial-reuse.pptx, IEEE 802.11-20/0107r1,2020,total 12 pages.

* cited by examiner

FREQUENCY DOMAIN OFFSET METHOD AND APPARATUS

CROSS-REFERENCE TO RELATED APPLICATIONS

This application is a continuation of International Application No. PCT/CN2021/127294, filed on Oct. 29, 2021, which claims priority to Chinese Patent Application No. 202011281358.8, filed on Nov. 16, 2020. The disclosures of the aforementioned applications are herein incorporated by reference in their entireties.

TECHNICAL FIELD

This application relates to the field of communication technologies, and more specifically, to a signal transmission method and apparatus.

BACKGROUND

In various multi-access point (AP) collaboration and concurrency solutions, space division multiple access (SDMA)/spatial division multiplexing has low implementation overheads and high air interface utilization. This is a competitive concurrency solution. An AP 0 and an AP 1 are used as an example. The AP 0 and the AP 1 send signals at a same time. When receiving a target signal from the AP 0, a terminal device further receives an interfering signal from the AP 1.

To simplify a scheduling procedure of a central AP and maximize air interface utilization, a multi-AP joint scheduling mode is used for sending signals simultaneously on a same frequency. While effectively improving network throughput, this technology causes mutual interference to transmission and affects detection performance on a receiving side.

SUMMARY

This application provides a signal transmission method and apparatus, to improve detection performance on a receiving side.

According to a first aspect, a signal transmission method is provided. The method may be performed by a device (for example, denoted as a collaboration device), or may be performed by a chip, a chip system, or a circuit configured in the device. This is not limited in this application.

The method may include: receiving a synchronization trigger frame, obtaining information about a time domain offset and/or information about a frequency domain offset, and sending a signal based on the synchronization trigger frame and the information about the time domain offset and/or the information about the frequency domain offset.

For example, the time domain offset indicates an offset on a predetermined time domain resource. For example, the predetermined time domain resource is time T (for example, a time point at which the synchronization trigger frame is received is T) and the time domain offset is $\Delta T$.

In this case, a time point for sending the signal may be $T+\Delta T$.

For example, the frequency domain offset indicates an offset on a predetermined frequency domain resource. For example, the predetermined frequency domain resource is a frequency F (where a frequency on which the synchronization trigger frame is received is F) and the frequency domain offset is $\Delta F$. In this case, frequency domain for sending the signal may be $F+\Delta F$.

Based on the foregoing technical solution, the time domain offset and/or the frequency domain offset may be configured for the collaboration device. After receiving a trigger of the synchronization trigger frame, the collaboration device may determine, with reference to the information about the time domain offset and/or the information about the frequency domain offset, a time domain resource and/or a frequency domain resource for sending the signal, and send the signal. In this way, it can be implemented that a plurality of collaboration devices send different time domain resources and/or different frequency domain resources to a same terminal. The plurality of collaboration devices send the different time domain resources and/or the different frequency domain resources to a same terminal, and an interfering signal in channel estimation can be removed. This improves precision of the channel estimation and noise estimation at a receiving end, and improves demodulation performance at the receiving end and entire-network throughput.

With reference to the first aspect, in some implementations of the first aspect, the time domain offset or the frequency domain offset is determined based on a quantity of network devices with current concurrent signals and/or a quantity of terminal devices that receive the signals, or the time domain offset or the frequency domain offset is predefined.

Based on the foregoing technical solution, the time domain offset or the frequency domain offset may be predefined, or the time domain offset or the frequency domain offset may be dynamically configured based on an actual communication situation.

With reference to the first aspect, in some implementations of the first aspect, the method further includes: receiving information about a frequency offset and/or information about a time offset, where the frequency offset indicates a difference in frequency domain of concurrent signals of a plurality of network devices, and the time offset indicates a delay difference of the concurrent signals of the plurality of network devices.

Based on the foregoing technical solution, the collaboration device may acquire the information about the frequency offset and/or the information about the time offset, to determine, based on a real-time service concurrency requirement and the information about the frequency offset and/or the information about the time offset, frequency domain and time domain for sending the signal.

With reference to the first aspect, in some implementations of the first aspect, the frequency offset $\Delta f$ satisfies: $\Delta f < N_{co} * f_{Thr}$; and/or $\Delta f > f_{zp}$, where the frequency offset $\Delta f$ indicates the difference in frequency domain of the concurrent signals of the plurality of network devices, $f_{Thr}$ indicates a preset frequency offset error threshold, $N_{co}$ indicates the quantity of the network devices with the current concurrent signals, and $f_{zp}$ indicates correlation of pilots of signals sent by the network devices with the current concurrent signals.

For example, $\Delta f < f_{Thr}$.

$f_{zp}$ indicates the correlation of the pilots of the signals sent by the network devices with the current concurrent signals, in other words, it may be understood that a size off may indicate the correlation of the pilots of the signals concurrently sent by the collaboration devices. $\Delta f > f_{zp}$ indicates that $\Delta f$ is introduced, so that the correlation of the pilots of the signals sent by the network devices with the current concurrent signals is reduced below a threshold.

Based on the foregoing technical solution, the frequency offset Δf is introduced, and this still satisfies an acceptable frequency offset error range specified in a protocol. In addition, the correlation of the pilots can be reduced below a threshold, to effectively improve the demodulation performance.

According to a second aspect, a signal transmission method is provided. The method may be performed by a device (for example, denoted as a central device), or may be performed by a chip, a chip system, or a circuit configured in the device. This is not limited in this application.

The method may include: determining a time domain offset and/or a frequency domain offset when signals are concurrently sent by $N_{co}$ network devices, where $N_{co}$ is an integer greater than 1; and sending a synchronization trigger frame, and information about the time domain offset and/or information about the frequency domain offset.

With reference to the second aspect, in some implementations of the second aspect, the time domain offset or the frequency domain offset is determined based on $N_{co}$ and/or a quantity of terminal devices that receive concurrent signals of $N_{co}$ network devices, or the time domain offset or the frequency domain offset is predefined.

With reference to the second aspect, in some implementations of the second aspect, the method further includes: sending information about a frequency offset and/or information about a time offset, where the frequency offset indicates a frequency difference of concurrent signals of $N_{co}$ network devices, and the time offset indicates a delay difference of the concurrent signal of $N_{co}$ network devices.

With reference to the second aspect, in some implementations of the second aspect, the frequency offset Δf satisfies: $\Delta f < N_{co} * f_{Thr}$; and/or $\Delta f > f_{zp}$, where the frequency offset indicates the frequency difference of the concurrent signal of $N_{co}$ network devices, $f_{Thr}$ indicates a preset frequency offset error threshold, and $f_{zp}$ indicates correlation of pilots of signals sent by $N_{co}$ network devices.

According to a third aspect, a signal transmission method is provided. The method may be performed by a terminal device, or may be performed by a chip, a chip system, or a circuit configured in the terminal device. This is not limited in this application.

The method may include: receiving concurrent signals of $N_{co}$ network devices on different time domain resources and/or different frequency domain resources, where $N_{co}$ is an integer greater than 1; and determining, based on the different time domain resources and/or the different frequency domain resources, a signal sent by a target network device in $N_{co}$ network devices.

With reference to the third aspect, in some implementations of the third aspect, a frequency offset Δf satisfies: $\Delta f < N_{co} * f_{Thr}$; and/or $\Delta f > f_{zp}$, where the frequency offset indicates a frequency difference of the concurrent signals of $N_{co}$ network devices, $f_{Thr}$ indicates a preset frequency offset error threshold, and $f_{zp}$ indicates correlation of pilots of signals sent by $N_{co}$ network devices.

According to a fourth aspect, a communication apparatus is provided. The communication apparatus is configured to perform the methods provided in the first aspect to the third aspect. Specifically, the communication apparatus may include modules configured to perform the methods provided in the first aspect to the third aspect.

According to a fifth aspect, a communication apparatus is provided, including a processor. The processor is coupled to a memory, and may be configured to execute instructions in the memory, to implement the method in any one of the first aspect to the third aspect or the possible implementations of the first aspect to the third aspect. Optionally, the communication apparatus further includes the memory. Optionally, the communication apparatus further includes a communication interface, the processor is coupled to the communication interface, and the communication interface is configured to input and/or output information. The information includes at least one of the instructions and data.

In an implementation, the communication apparatus is a device. When the communication apparatus is the device, the communication interface may be a transceiver or an input/output interface.

In another implementation, the communication apparatus is a chip or a chip system. When the communication apparatus is the chip or the chip system, the communication interface may be an input/output interface, or may be an input/output interface, an interface circuit, an output circuit, an input circuit, a pin, a related circuit, or the like on the chip or the chip system. The processor may alternatively be a processing circuit or a logic circuit.

In another implementation, the communication apparatus is a chip or a chip system disposed in a device.

Optionally, the transceiver may be a transceiver circuit. Optionally, the input/output interface may be an input/output circuit.

According to a sixth aspect, a computer-readable storage medium is provided. The computer-readable storage medium stores a computer program, and when the computer program is executed by a communication apparatus, the communication apparatus is enabled to implement the method in any one of the first aspect to the third aspect or the possible implementations of the first aspect to the third aspect.

According to a seventh aspect, a computer program product including instructions is provided. When the instructions are executed by a computer, a communication apparatus is enabled to implement the methods provided in the first aspect to the third aspect.

According to an eighth aspect, a communication system is provided. The communication system includes the collaboration device and the central device, or includes the collaboration device, the central device, and the terminal device.

DESCRIPTION OF EMBODIMENTS

The following describes technical solutions of this application with reference to the accompanying drawings.

An embodiment of this application provides a communication method applied to a wireless communication system. The wireless communication system may be a wireless local area network (WLAN) or a cellular network. The method may be implemented by a communication device in the wireless communication system or a chip or a processor in the communication device. The communication device may be a wireless communication device in multi-device collaboration. For example, the communication device may be an access point (AP) device, or may be a station (STA) device. For example, the communication device may alternatively be a multi-link device (MLD).

For ease of understanding embodiments of this application, a communication system applicable to embodiments of this application is first described in detail with reference to FIG. 1 and FIG. 2.

Figure 1:
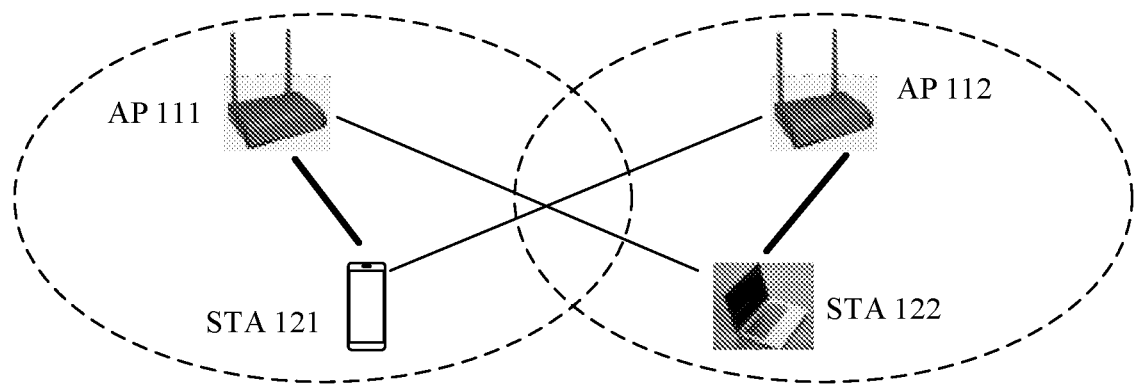
FIG. 1 is a schematic diagram of a wireless communication system applicable to an embodiment of this application.

FIG. 1 is a schematic diagram of a wireless communication system 100 applicable to an embodiment of this application. As shown in FIG. 1, the technical solutions in embodiments of this application may be applied to a wireless local area network, for example, a multi-AP concurrency scenario. The wireless communication system 100 may include at least two access point devices, such as an AP 111 and an AP 112 shown in FIG. 1. The wireless communication system 100 may further include at least two station devices, such as a STA 121 and a STA 122 shown in FIG. 1. For example, the AP may be a multi-link AP, or the STA may be a multi-link STA. For example, the AP 111 and the AP 112 may be collaboration APs, or the AP 111 and the AP 112 may be collaboration APs, and the AP 111 or the AP 112 may be a central AP.

One or more STAs in the station devices may communicate with one or more APs in the access point devices. For example, as shown in FIG. 1, the AP 111 and the AP 112 simultaneously send signals to the STA 121 and the STA 122 respectively, and the STA 121 receives a target signal from the AP 111 and an interfering signal from the AP 112. Similarly, the STA 122 receives a target signal from the AP 112 and an interfering signal from the AP 111.

Figure 2:
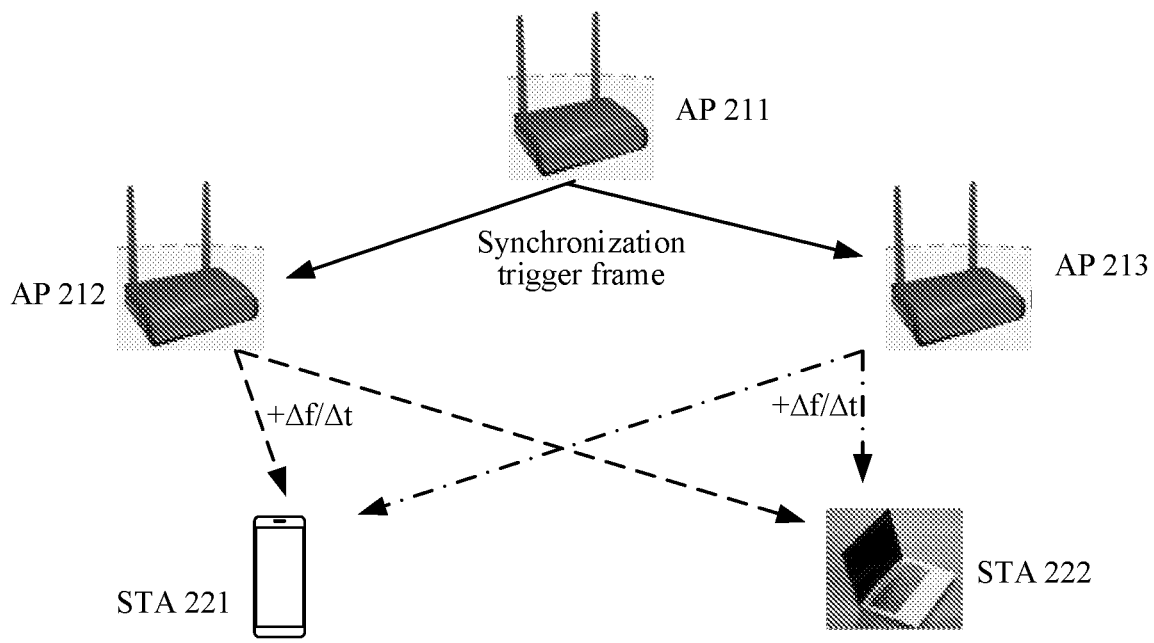
FIG. 2 is a schematic diagram of a wireless communication system applicable to another embodiment of this application.

FIG. 2 is a schematic diagram of a wireless communication system 200 applicable to another embodiment of this application. As shown in FIG. 2, the technical solutions in embodiments of this application may be applied to a wireless local area network, for example, a multi-AP collaboration and concurrency scenario or a multi-AP simultaneous intra-frequency sending scenario in a Wi-Fi system. The wireless communication system 200 may include at least three access point devices, such as an AP 211, an AP 212, and an AP 213 shown in FIG. 2. The wireless communication system 200 may further include at least two station devices, such as a STA 221 and a STA 222 shown in FIG. 2. For example, the AP may be a multi-link AP, or the STA may be a multi-link STA. For example, the AP 211 may be a central AP, and the AP 212 and the AP 213 may be collaboration APs.

It should be understood that, in this embodiment of this application, the network device with collaboration and concurrent signals may be, for example, an access point device. For example, the network device with collaboration and concurrent signals may include an AP 111 and an AP 111.

It should be further understood that the communication system applicable to this application and described with reference to FIG. 1 and FIG. 2 is merely an example for description, and the communication system applicable to this application is not limited thereto. For example, the communication system may include more APs. For another example, the communication system may further include more STAs. For another example, embodiments of this application may be applied to a multi-device collaboration and concurrency scenario, for example, a multi-AP (Multi-AP) collaboration scenario, a space division multiple access (SDMA)/spatial division multiplexing concurrency scenario, a coordinated beamforming (CBF) scenario, a joint transmission (JT) scenario, a co-SR scenario, or the like.

The AP device in embodiments of this application may be a device in a wireless network. The AP device may be a communication entity, for example, a communication server, a router, a switch, or a bridge, or the AP device may include a macro base station, a micro base station, a relay station, or the like in various forms. Certainly, the AP may alternatively be a chip, a circuit, or a processing system in these various forms of devices, to implement the method and function in embodiments of this application. The AP device may be used in a plurality of scenarios, for example, a sensor node (for example, a smart water meter, a smart electricity meter, or a smart air detection node) in smart city, a smart device (for example, a smart camera, a projector, a display, a television, a stereo, a refrigerator, or a washing machine) in smart home, a node in the internet of things, an entertainment terminal (for example, AR, VR, or another wearable device), or a smart device in smart office (for example, a printer or a projector), an internet of vehicles device in the internet of vehicles, or some infrastructures (such as a vending machine, a self-service navigation console of a shopping mall or supermarket, a self-service cash register, and a self-service food ordering machine) in a daily life scenario.

The STA device in embodiments of this application may be a device having a wireless transceiver function, for example, may be a device that supports 802.11 series protocols and may communicate with an AP or another STA. For example, the STA is any user communication device that allows a user to communicate with an AP and communicate with a WLAN. The STA device is, for example, user equipment (UE), a mobile station (MS), a mobile terminal (MT), an access terminal, a subscriber unit, a subscriber station, a mobile station, a remote station, a remote terminal, a mobile device, a user terminal, a terminal, a wireless communication device, a user agent, a user apparatus, or the like.

The STA in embodiments of this application may be a device that provides a user with voice/data connectivity, for example, a handheld device or vehicle-mounted device having a wireless connection function. For example, the STA is a mobile phone (mobile phone), a tablet computer, a notebook computer, a palmtop computer, a mobile internet device (MID), a wearable device, a virtual reality (VR) device, an augmented reality (AR) device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (SIP) phone, a wireless local loop (WLL) station, a personal digital assistant (PDA), a hand-held device having a wireless communication function, a computing device or another processing device connected to a wireless modem, a vehicle-mounted device, a wearable device, a terminal device in a 5G network, or a terminal device in a future evolved public land mobile network (PLMN). This is not limited in embodiments of this application.

By way of example, and not limitation, in embodiments of this application, the STA device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. For example, smart watches or smart glasses, and devices that focus on only one type of application function need to work with other devices such as smartphones, such as various smart bands or smart jewelry for monitoring physical signs.

In addition, in embodiments of this application, the STA device may alternatively be a terminal device in an internet of things (IoT) system. The IoT is an important part of future development of information technologies, and a main technical feature of the IoT is to connect a thing to a network by using a communication technology, to implement an intelligent network for interconnection between a person and a machine or between one thing and another. In embodiments of this application, an IoT technology may implement massive connections, deep coverage, and terminal power saving by using, for example, a narrow band (narrow band) NB technology.

In addition, in embodiments of this application, the STA device may be a device in an internet of vehicles system. Communication modes in an internet of vehicles system are collectively referred to as V2X (where X indicates everything). For example, the V2X communication includes vehicle to vehicle (V2V) communication, vehicle to infrastructure (V2I) communication, vehicle to pedestrian (V2P) communication, or vehicle to network (V2N) communication.

In addition, in embodiments of this application, the STA device may further include a sensor, for example, an intelligent printer, a train detector, or a gas station. Main functions of the STA device include collecting data (by some terminal devices), receiving control information and downlink data from an AP device, sending an electromagnetic wave, and transmitting data to an AP device.

In addition, the AP device in embodiments of this application may be a device configured to communicate with the STA device. The AP device may be a network device in a wireless local area network, and the AP device may be configured to communicate with the STA device by using the wireless local area network.

It should be understood that specific forms of the STA device and the AP device are not specially limited in embodiments of this application, and are merely examples for description herein.

Features of high-density Wi-Fi office scenarios include a large quantity of APs and a short distance between APs, and a large quantity of terminals access the network, which may cause more competition collisions on the network. A large quantity of terminals access the network mean a high concurrent demand for users. Therefore, in a Wi-Fi multi-AP networking scenario, to improve network throughput, a manner in which a plurality of APs simultaneously transmit signals to different STAs is usually used to improve performance, for example, the manner includes but is not limited to SDMA, CBF, and JT. For example, the co-SR solution proposed by the 802.11be working group of Wi-Fi7 in the next generation protocol architecture is implemented in a collaboration and concurrency manner. In various multi-AP collaboration and concurrency solutions, the SDMA has low implementation overheads and high air interface utilization. Therefore, the SDMA is a competitive concurrency solution in a future Wi-Fi networking collaboration field.

In an existing SDMA solution, to simplify a scheduling procedure of a central AP and maximize air interface utilization, an AP manufacturer prefers to use a multi-AP joint scheduling mode to send signals simultaneously on a same frequency. In addition to effectively improving network throughput, this technology causes mutual interference between transmissions. Therefore, to ensure that mutual interference is controllable and downlink performance is not affected, concurrent transmission is used only when isolation of received signals from different APs to a STA satisfies a requirement.

However, if isolation of transmission signals from APs to a same STA is high, there is a low probability that concurrency takes effect, and improvement in a throughput rate of the entire network is limited. In addition, it is difficult to ensure isolation of more than 30 dB in dense networking scenarios. In this case, FIG. 1 is used as an example. Because a physical layer protocol data unit (PPDU) signal from the AP 111 to the STA 121 is synchronized in time with a PPDU signal from the AP 112 to the STA 121, PPDU frame lengths are the same, and duration of each field overlaps and collides with each other. The detection performance of a STA receiver is greatly affected.

In view of this, an embodiment of this application provides a method, so that correlation between pilot sequences sent by a plurality of APs to a same STA is reduced, and detection performance of the STA receiver is improved.

The following describes in detail embodiments provided in this application with reference to the accompanying drawings.

In the following embodiments, a collaboration AP indicates APs that collaboratively and concurrently send signals. In other words, the collaboration AP indicates an AP cluster that sends different signals at a same time and on a same frequency under a control of the central AP.

In the following embodiments, the central AP indicates an AP that jointly schedules the collaboration AP. The central AP, for example, may send a synchronization trigger frame. For another example, a time domain offset and/or a frequency domain offset of the collaboration AP may be further calculated. For another example, a time domain offset and/or a frequency domain offset of the collaboration AP may be further sent. For another example, a frequency offset and/or a time offset between different collaboration APs may be further calculated. For another example, a frequency offset and/or a time offset between different collaboration APs may be further sent. The central AP may be a virtual entity, may be an independent AP, or may be one of collaboration APs. This is not limited.

Figure 3:
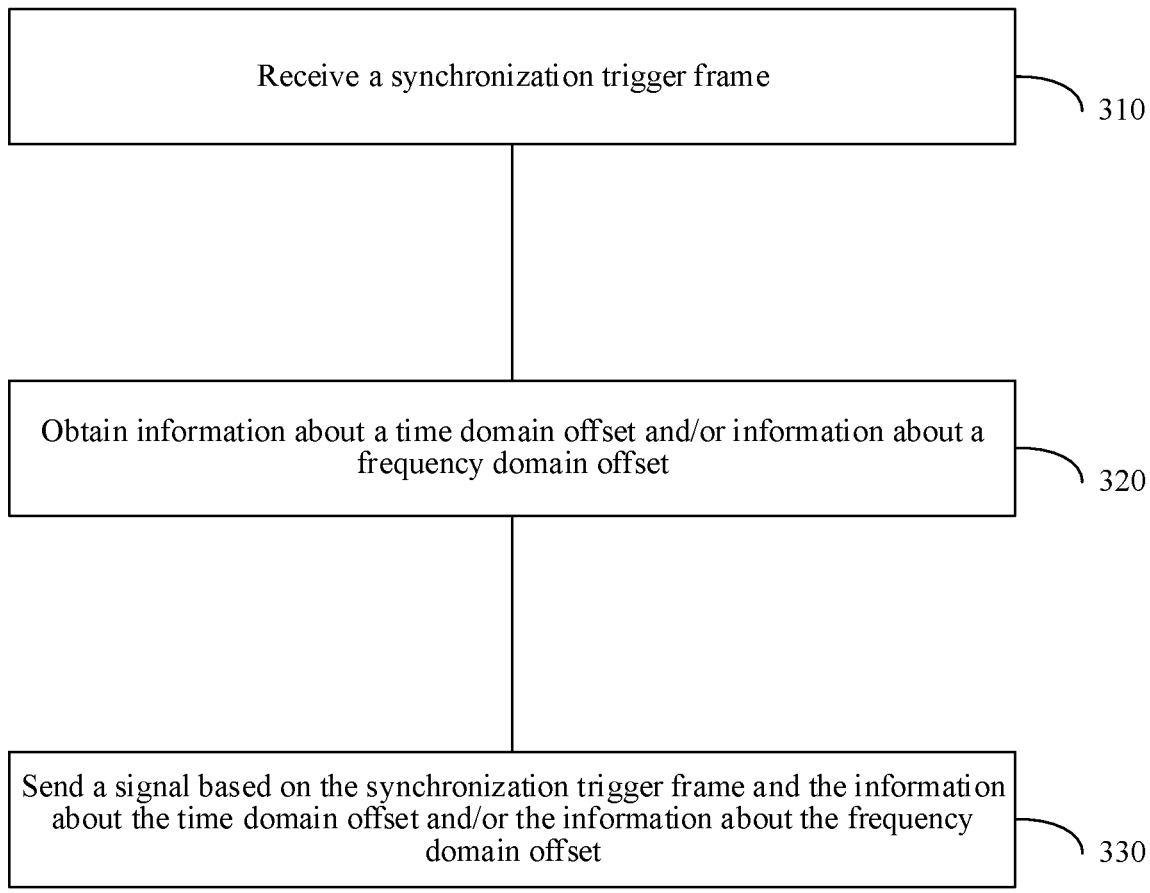
FIG. 3 is a schematic diagram of a signal transmission method according to an embodiment of this application.

FIG. 3 is a schematic diagram of a signal transmission method 300 according to an embodiment of this application. As shown in FIG. 3, the method 300 may include the following steps.

310: Receive a synchronization trigger frame.

320: Obtain information about a time domain offset and/or information about a frequency domain offset.

330: Send a signal based on the synchronization trigger frame and the information about the time domain offset and/or the information about the frequency domain offset.

For ease of description, an offset of frequency domain resources sent by a plurality of collaboration APs to a same receiving end (for example, a same STA) is denoted as a frequency offset, and an adjustment amount of the collaboration AP in frequency domain is denoted as a frequency domain offset (or may also be denoted as a pre-correction adjustment amount). It may be understood that, a frequency domain offset is introduced for the collaboration AP, so that frequency domain resources sent by a plurality of collaboration APs to a same STA have a frequency offset.

For ease of description, an offset of time domain resources sent by a plurality of collaboration APs to a same receiving end (for example, a same STA) is denoted as a time offset, and adjustment amount of the collaboration AP in time domain is denoted as a time domain offset (or may also be denoted as a pre-correction adjustment amount). It may be understood that, a time domain offset is introduced for the collaboration AP, so that time domain resources sent by a plurality of collaboration APs to a same STA have a frequency offset.

In this embodiment of this application, a time domain offset and/or a frequency domain offset may be configured for the collaboration AP. After receiving a trigger of the synchronization trigger frame, the collaboration AP may determine, with reference to the information about the time domain offset and/or the frequency domain offset, a time domain resource and/or a frequency domain resource for sending the signal, and send the signal. In this way, it can be implemented that a plurality of collaboration APs send different time domain resources and/or frequency domain resources to a same STA. The plurality of collaboration APs send the different time domain resources and/or the different frequency domain resources to a same STA, and an interfering signal in channel estimation can be removed. This improves precision of the channel estimation and noise estimation at a receiving end, and improves demodulation performance at the receiving end and entire-network throughput.

The following describes three possible solutions by using an example in which a plurality of collaboration APs send signals to a STA.

Solution 1: Frequency domain resources sent by a plurality of collaboration APs to a same STA are different, or frequency domain resources sent by a plurality of collaboration APs to a same STA have deviations.

For example, an AP 0 and an AP 1 are used as an example. Based on the solution 1, it may be designed that frequency domain resources sent by the AP 0 and the AP 1 to a same STA are different, so that the AP 0 and the AP 1 have a frequency offset $\Delta f$ on a STA side. The frequency offset $\Delta f$ indicates an offset between the frequency domain resources of the AP 0 and the AP 1 on the STA side.

Optionally, a central AP determines the frequency offset $\Delta f$. The central AP may be the AP 0 or the AP 1, or may be another AP. This is not limited.

In a possible implementation, a frequency domain offset may be configured for each collaboration AP through joint scheduling of the central AP. After receiving the trigger of the synchronization trigger frame, the collaboration AP determines, with reference to the frequency domain offset configured for the collaboration AP, the frequency domain resources to be sent to the STA.

The frequency offset $\Delta f$ is introduced, and this still satisfies an acceptable frequency offset error range specified in a protocol. Usually, the AP has an allowable frequency offset error. Frequency domain adjustment for each AP needs to satisfy the following requirements: After the frequency domain offset is introduced for each collaboration AP, a remaining frequency offset is still within the acceptable frequency offset error range defined in the protocol, that is, $\Delta t$ is still within the acceptable frequency offset error range defined in the protocol. As an example but not a limitation, it is assumed that a preset frequency offset error threshold, or a maximum frequency offset of an AP defined in a protocol, is denoted as $f_{Thr}$. In this case, the frequency offset $\Delta f$ is less than $f_{Thr}$.

For example, to make the frequency offset error range defined in the protocol still within the acceptable frequency offset error range after $\Delta f$ is introduced, the central AP may obtain, in advance, a frequency offset value caused by a crystal oscillator before frequency domain adjustment is performed on each collaboration AP. For example, when interacting with collaboration APs, the central AP may obtain frequency offset values of all collaboration APs.

For ease of description, $f_{center}$ indicates an absolute frequency offset value of the central AP, that is, the central AP obtains, in advance, a frequency offset value relative to $f_{center}$ before frequency domain adjustment is performed on each collaboration AP.

In a manner, the central AP uses special hardware that can calibrate the crystal oscillator to ensure that a frequency offset between the frequency and a reference carrier frequency is small, that is, $f_{center}=0$.

In another manner, an absolute frequency offset value of the central AP is approximately obtained by averaging estimated frequency offset values from the plurality of collaboration APs. The absolute frequency offset value of the central AP may satisfy Formula 1. As an example but not a limitation, this manner may be applicable to a scenario in which there are a large quantity of collaboration APs.

$$-f_{center} = \bar{f} = \frac{1}{N_{co}} \sum_{n=N_{co}} f_n \qquad \text{Formula 1}$$

$N_{co}$ indicates a quantity of collaboration APs.

Therefore, an absolute frequency offset value of each collaboration AP compared with a frequency offset of 0 is further obtained. The AP 0 is used as an example. An absolute frequency offset value $\bar{f}_0$ of the AP compared with the frequency offset of 0 may be obtained by using Formula 2.

$$\bar{f}_0 = f_0 - \bar{f} = f_0 + f_{center} \qquad \text{Formula 2}$$

It should be understood that the foregoing two manners are merely examples for description, and any manner in which the central AP can obtain the frequency offset value caused by the crystal oscillator before frequency domain adjustment is performed on each collaboration AP is applicable to this embodiment of this application.

After obtaining the frequency offset value of each collaboration AP without frequency domain adjustment, the central AP may schedule a plurality of APs to implement coordinated concurrency (for example, SDMA concurrency). For example, after obtaining the frequency offset value of each collaboration AP without frequency domain adjustment, the central AP may schedule two APs whose frequency offset difference is large to implement coordinated concurrency (for example, SDMA concurrency).

Each collaboration AP may introduce a frequency domain offset. As an example but not a limitation, after the central AP obtains the frequency offset value of each collaboration AP without frequency domain adjustment, if a frequency offset difference between two APs is small, the frequency domain offset may be introduced.

Optionally, the frequency domain offset may be sent by the central AP to the collaboration AP. For example, when sending the synchronization trigger frame to the collaboration AP, the central AP adds the frequency domain offset to the synchronization trigger frame. Alternatively, the central AP may separately send the frequency domain offset to the collaboration AP. This is not limited.

Optionally, the central AP may calculate and schedule a frequency domain adjustment amount indicated to each collaboration AP according to a quantity of collaboration APs that currently need to send signals concurrently and/or a quantity of receiving end users.

Optionally, the frequency domain offset of each collaboration AP may be statically configured, or may be configured dynamically. This is not limited.

One manner is static configuration.

In an actual scenario, a multi-AP concurrent single frequency network (SFN) cluster includes a plurality of APs. For example, the SFN cluster includes APs that satisfy a signal isolation requirement. When the static configuration manner is used, a frequency domain offset of each AP may be predefined. Alternatively, a frequency offset between the collaboration APs may be predefined, and the frequency domain offset of each collaboration AP is determined based on the frequency offset.

Based on the static configuration manner, each collaboration AP may obtain the frequency domain offset of the collaboration AP in advance. After the central AP delivers the synchronization trigger frame to the collaboration AP, the collaboration AP may introduce the frequency domain offset into a concurrent PPDU frame based on the synchronization trigger frame and the pre-obtained frequency domain offset.

The other manner is dynamic configuration.

When the dynamic configuration manner is used, frequency domain offsets may be separately allocated to different collaboration APs according to real-time service requirements. Alternatively, a frequency offset between the collaboration APs may be determined according to a real-time service requirement, and a frequency domain offset is allocated to each collaboration AP based on the frequency offset. For example, according to a real-time service concurrency requirement, requirements for X-LTF signal isolation at different signal isolation levels are trained in advance, so that different frequency domain offsets are allocated to all collaboration APs.

Based on the dynamic configuration manner, when delivering the synchronization trigger frame, the central AP may send the allocated frequency domain offset to the collaboration AP. After the central AP delivers the synchronization trigger frame to the collaboration AP, the collaboration AP may introduce the frequency domain offset into the concurrent PPDU frame based on the synchronization trigger frame and frequency domain offset information carried in the synchronization trigger frame.

Figure 4:
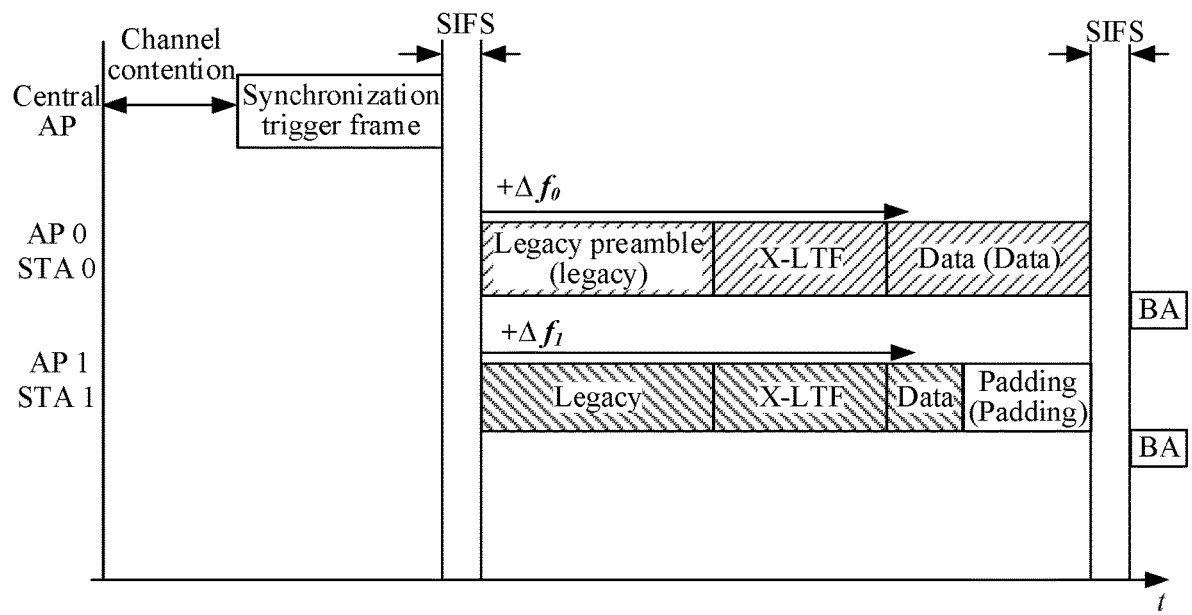
FIG. 4 is a schematic diagram of a scenario in which a central AP controls concurrency of two collaboration APs and applicable to an embodiment of this application.

With reference to FIG. 4, the following uses an AP 0 and an AP 1 as an example for description.

FIG. 4 is used as an example. A central AP may estimate, based on interaction frames of the AP 0 and the AP 1, a frequency offset $f_0$ corresponding to the AP 0 and a frequency offset $f_1$ corresponding to the AP 1. It is assumed that a frequency domain offset of the AP 0 is $\Delta f_0$, and a frequency domain offset of the AP 1 is $\Delta f_1$. It is assumed that a synchronization trigger frame carries information about the frequency domain offset.

The central AP delivers the synchronization trigger frame to the AP 0 and the AP 1. After receiving the synchronization trigger frame, the AP 0 and the AP 1 trigger PPDU concurrency. In addition, based on the information that is about the frequency domain offset and that is carried in the synchronization trigger frame, the AP 0 introduces the frequency domain offset $\Delta f_0$ into a concurrent PPDU frame, and the AP 1 introduces the frequency domain offset $\Delta f_1$ into the concurrent PPDU frame.

After a frequency domain offset is introduced to each collaboration AP, a frequency offset $\Delta f$ between the collaboration APs satisfies:

$$\Delta f < N_{co} * f_{Thr};\ \text{and/or}\ \Delta f > f_{zp}.$$

Figure 5:
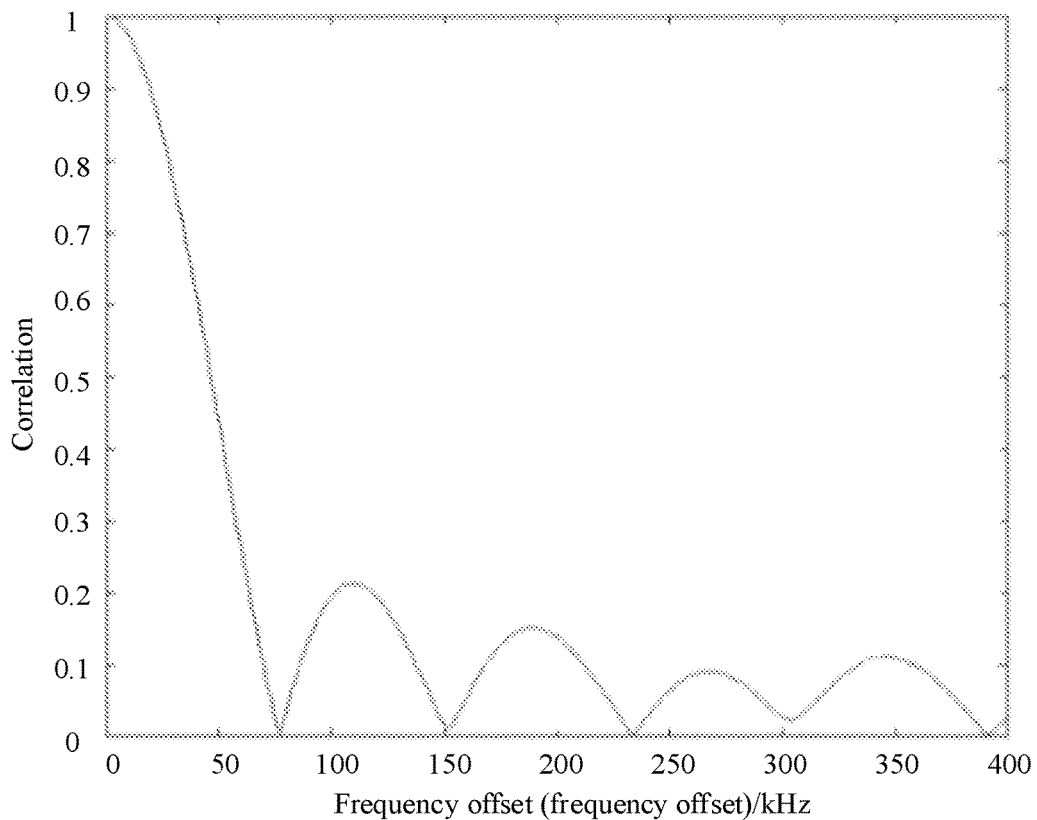
FIG. 5 is a schematic diagram of a trend of pilot sequence correlation that changes with a frequency offset according to an embodiment of this application.

Thr indicates a preset frequency offset error threshold, or a maximum frequency offset of an AP defined in a protocol. $N_{co}$ indicates a quantity of APs with concurrent signals, that is, a quantity of collaboration APs. $f_{zp}$ indicates correlation between pilots of signals sent by APs with current concurrent signals. To be specific, a size off may indicate correlation degree of pilots of concurrent PPDUs of collaboration APs. As shown in FIG. 5, $f_{zp}$ may correspond to a frequency offset difference between a pilot correlation and a threshold in FIG. 5.

For example, the AP 0 and the AP 1 are used as an example. It is assumed that the maximum frequency offset of the AP defined in the protocol is $f_{Thr}$. Then, the collaboration AP is adjusted separately, $$s_{AP0} = s_{AP0} * e^{j\Delta f_0 t}$$

$$s_{AP1} = s_{AP1} * e^{j\Delta f_1 t}$$

so that the frequency offset between the AP 0 and the AP 1 on the STA side satisfies Formula 3.

$$2f_{Thr} > \bar{f}_0 + \Delta f_0 - \bar{f}_1 - \Delta f_1 = \Delta f > f_{zp} \qquad \text{Formula 3}$$

After the frequency domain offset is introduced for each collaboration AP, the frequency offset $\Delta f$ between the collaboration APs satisfies a condition. For example, in Formula 3, not only the maximum frequency offset of the AP specified in the protocol can be satisfied, but also the pilot correlation can be reduced below a specific threshold. Therefore, demodulation performance can be effectively improved.

The following describes, by using an example in which the AP 0 and the AP 1 collaborate to transmit signals to a STA 0 (where the AP 0 sends a target signal to the STA 0, and the AP 1 sends an interfering signal to the STA 0), demodulation of the STA 0 performed after the frequency domain offset is introduced.

It is assumed that a transmit-end pilot signal is $s_{X-LTF2}(l)$, where l is a subcarrier index l=0, ..., M−1, and M is a quantity of subcarriers allocated in frequency domain. For example, IFFT is performed to transform to time domain by using Formula 4.

$$s_{X-LTF2}(m) = \frac{1}{\sqrt{N}} \sum_{l=0}^{M-1} s_{X-LTF}(l) e^{j \cdot 2\pi \cdot \frac{lm}{N}} \quad \text{Formula 4}$$

After the frequency domain offset ($f_{AP0toSTA0}$) between the AP 0 and the STA 0 and the frequency domain offset ($f_{AP0toSTA0}+\Delta f$) between the AP 1 and the STA 0 are introduced, transmit signals of the AP 0 and the AP 1 are $s_{AP0toSTA0}$ (m) and $s_{AP1toSTA0}$ (m), respectively. $s_{AP0toSTA0}$ (m) may be expressed as Formula 5, and $s_{AP1toSTA0}$ (m) may be expressed as Formula 6.

$$s_{AP0toSTA0}(m) = \frac{1}{\sqrt{N}} \sum_{l=0}^{M-1} s_{X-LTF}(l) e^{j \cdot 2\pi \cdot \frac{lm}{N}} e^{j \cdot 2\pi \cdot \frac{f_{AP0toSTA0}}{f_s} m} \quad \text{Formula 5}$$

$$s_{AP1toSTA0}(m) = \frac{1}{\sqrt{N}} \sum_{l=0}^{M-1} s_{X-LTF}(l) e^{j \cdot 2\pi \cdot \frac{lm}{N}} e^{j \cdot 2\pi \cdot \frac{f_{AP0toSTA0}+\Delta f}{f_s} m} \quad \text{Formula 6}$$

After receiving the signal, the STA 0 performs frequency offset estimation, where an estimated frequency offset value is $\hat{f}$. Because a signal power is greater than an interference power, $\hat{f} \rightarrow f_{AP0toSTA0}$. Therefore, a signal converted to the frequency domain after frequency offset compensation may be indicated as $R_{STA0}$ (k), and $R_{STA0}$ (k) may be expressed as Formula 7. k is a subcarrier index, and k=0, . . . , N−1. N is a quantity of subcarriers allocated in frequency domain.

$$R_{STA0}(k) \cong \quad \text{Formula 7}$$
$$H_{AP0toSTA0}(k) \cdot s_{X-LTF}(k) + H_{AP1toSTA0}(k) \cdot s'_{X-LTF}(k) + n_{X-LTF}$$

$$s'_{x-LTF}(k) = \frac{1}{\sqrt{N}} \sum_{l=0}^{N-1} s_{X-LTF}(l) \sum_{m=0}^{N-1} e^{j \cdot 2\pi \cdot \frac{(l-k)m}{N}} e^{j \cdot 2\pi \cdot \frac{\Delta f}{f_s} m}.$$

$s_{X-LTF}$ indicates a pilot sequence of a target signal sent by the AP 0 to the STA 0, and $s'_{X-LTF}$ indicates a pilot sequence of an interfering signal sent by the AP 1 to the STA 0. $H_{AP0toSTA0}$ indicates the target signal sent by the AP 0 to the STA 0, and $H_{AP1toSTA0}$ indicates an interfering signal sent by the AP 1 to the STA 0.

When a frequency offset difference is large, the correlation between sequences $s_{X-LTF}$ and $s'_{X-LTF}$ can be significantly reduced. After channel estimation (for example, least square (least square, LS) channel estimation) is performed, energy of the interfering channel leaks outside a window of channel estimation noise reduction. The channel estimation noise reduction can effectively filter out channels of interfering signals (including interference from concurrent non-target APs) and improve noise measurement accuracy.

Figure 6:
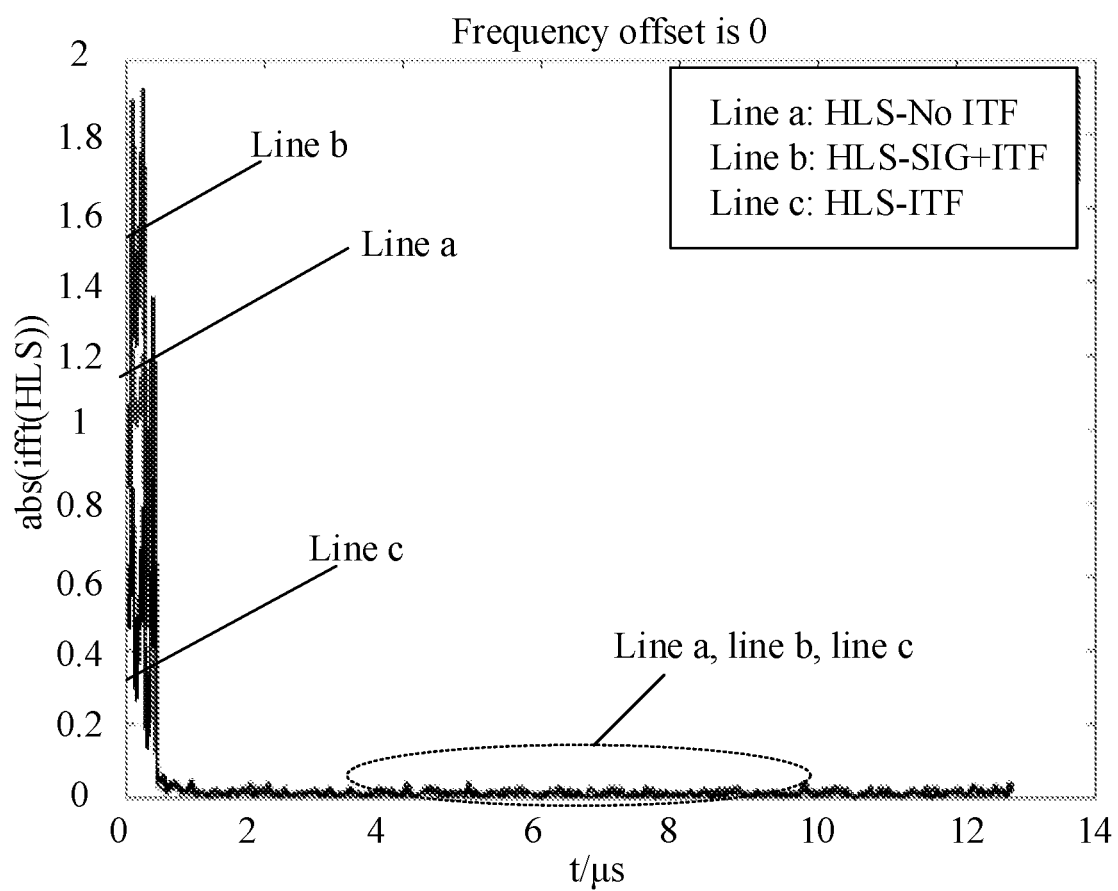
FIG. 6 is a schematic diagram of an interfering signal and a target signal when there is no frequency offset.
Figure 7:
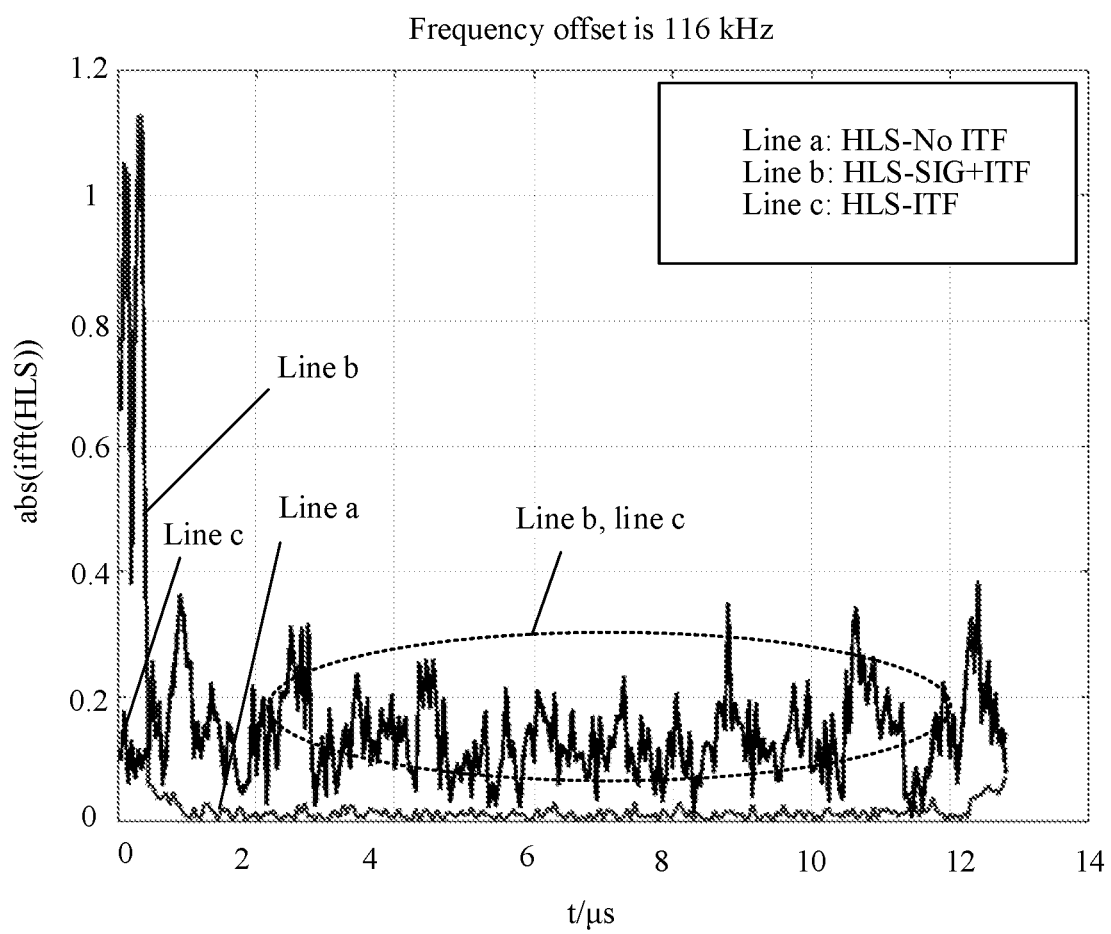
FIG. 7 is a schematic diagram of an interfering signal and a target signal when there is a frequency offset.

FIG. 6 and FIG. 7 respectively show schematic diagrams of an interfering signal and a target signal displayed when there is no frequency offset and when there is a frequency offset. In FIG. 6 and FIG. 7, the vertical ordinate abs(ifft (HLS)) indicates that abs processing is performed after the HLS inverse fast fourier transformation (invert fast fourier transformation, IFFT) is performed. For example, the LS channel estimation is performed. In FIG. 6 and FIG. 7, a line a indicates time domain power distribution of LS channel estimation without interference, a line b indicates time domain power distribution of LS channel estimation of an interfered target signal, and a line c indicates time domain power distribution of LS channel estimation of an interfering signal.

In FIG. 6, a frequency offset between the interfering signal and the target signal is 0. In FIG. 7, the frequency offset between the interfering signal and the target signal is 116 kHz. It can be learned from FIG. 6 and FIG. 7 that, when the frequency offset is 0, that is, as shown in FIG. 6, channel estimation of the interfering signal and channel estimation of the target signal are superimposed at almost the same time of arrival, and both the interference and the signal increase after equalization. When the frequency offset is large, as shown in FIG. 7, inter-subcarrier interference caused by the frequency offset and channel distortion of the interfering signal are distributed outside the window of channel estimation noise reduction through windowing, so that most interference can be effectively filtered out.

An x-long training field (x-LTF) correlation that changes along with different frequency offsets is shown in FIG. 5. It may be understood that x may indicate LTFs of different types. It can be seen from FIG. 5 that, as the frequency offset increases, the correlation between the interfering signal and the target signal gradually decreases.

Figure 8:
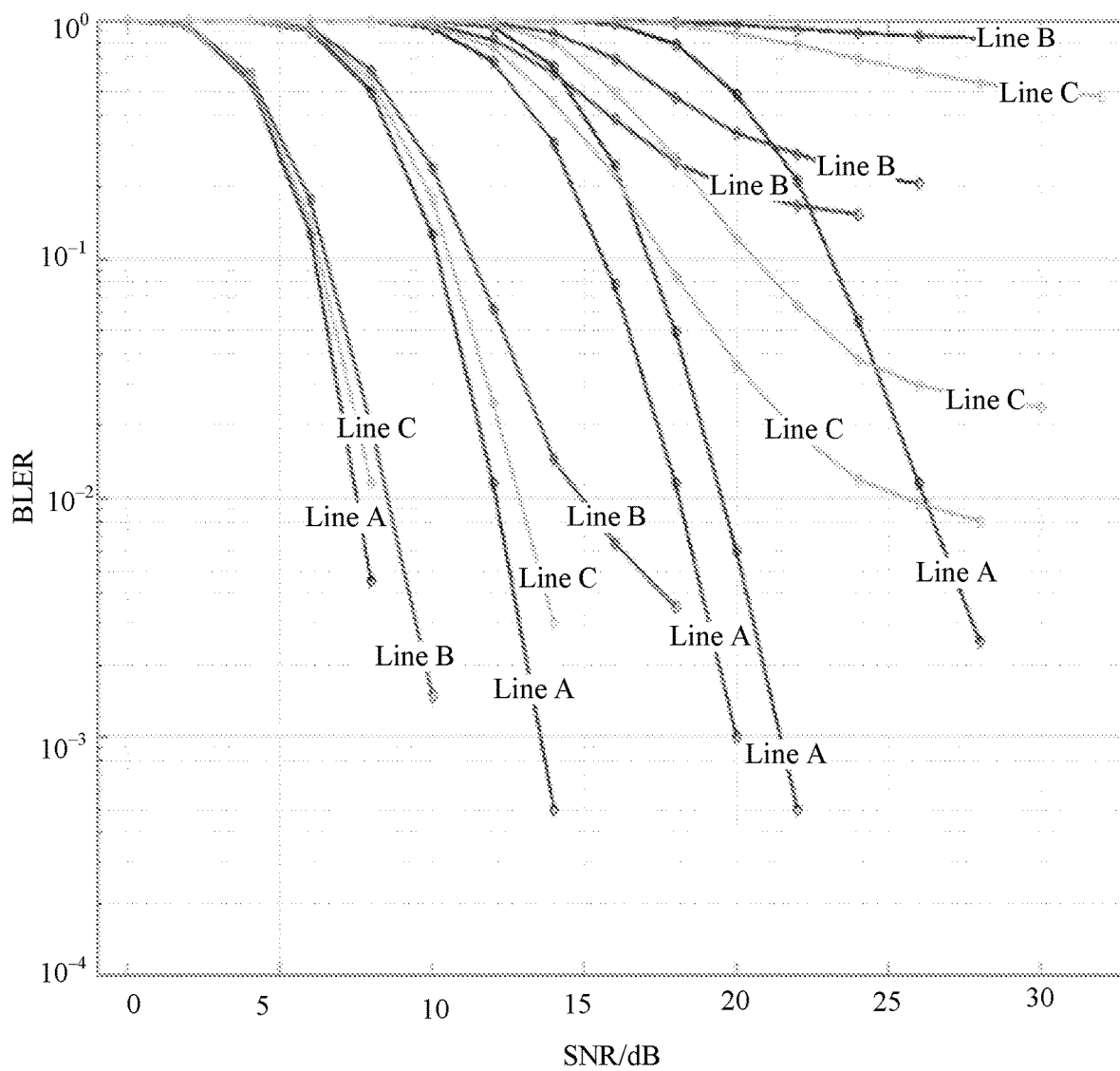
FIG. 8 is a schematic diagram of performance comparison of different frequency offsets.

FIG. 8 shows a performance comparison of different frequency offsets. In FIG. 8, a line A indicates a performance curve without interference, and a plurality of lines A may be performance curves without interference obtained indifferent conditions (for example, in different modulation and coding schemes (MCSs)). A line B and a line C indicate that an interfering signal arrives at a same time as a target signal, and a power of the interfering signal is lower than a power of the target signal. For example, the power of the interfering signal is 20 dB lower than the power of the target signal. The line B indicates that the frequency offset between the interfering signal and the target signal is 0, and a plurality of lines B may be performance curves obtained in different conditions (for example, in different MCSs with a frequency offset of 0). The line C indicates that the frequency offset between the interfering signal and the target signal is 232 kHz. A plurality of lines B may be performance curves obtained in different conditions (for example, in different MCSs with no frequency offset). It can be learned by comparing the line B with the line C that demodulation performance can be effectively improved by increasing a frequency offset between signals. For example, an order of a modulation and coding scheme (MCS) for scheduling can be increased by two, and a throughput rate can be greatly improved.

Based on the foregoing solution 1, the frequency domain offset is introduced to the collaboration APs, so that there is a frequency offset between the collaboration APs. For example, through joint scheduling of a central AP, a specific frequency offset is separately added when transmitting ends of collaboration APs concurrently send signals. It can be learned from FIG. 5 to FIG. 8 that, as the frequency offset increases, the demodulation performance can be improved, and the throughput rate can be improved. In addition, as the frequency offset between the collaboration APs increases, the correlation between the interfering signal and the target signal gradually decreases. Therefore, the energy of the interfering channel is leaked outside the window of channel estimation noise reduction. Through the channel estimation noise reduction, a channel of the interfering signal can be effectively filtered out, and noise measurement accuracy can be improved.

Solution 2: Time domain resources sent by a plurality of collaboration APs to a same STA are different, or time domain resources sent by a plurality of collaboration APs to a same STA have deviations.

For example, the AP 0 and the AP 1 are used as an example. Based on the solution 2, it may be designed that time domain resources sent by the AP 0 and the AP 1 to a same STA are different, so that the AP 0 and the AP 1 have a time offset $\Delta f$ (or a delay difference) on the STA side. The time offset $\Delta f$ indicates the delay difference between the AP 0 and the AP 1 on the STA side.

Optionally, the central AP determines the time offset $\Delta f$. The central AP may be the AP 0 or the AP 1, or may be another AP. This is not limited.

In a possible implementation, a time domain offset may be configured for each collaboration AP through joint scheduling of the central AP. After receiving a trigger of a synchronization trigger frame, the collaboration AP determines, with reference to the time domain offset configured for the collaboration AP, a time domain resource to be sent to the STA.

Optionally, the time domain offset may be sent by the central AP to the collaboration AP. For example, when sending a synchronization trigger frame to the collaboration AP, the central AP adds the time domain offset to the synchronization trigger frame. Alternatively, the central AP may separately send the time domain offset to the collaboration AP. This is not limited.

Optionally, the central AP may calculate and schedule a time domain offset indicated to each collaboration AP according to a quantity of collaboration APs that currently need to send signals concurrently and/or a quantity of receiving end users.

Optionally, the time domain offset of each collaboration AP may be statically configured, or may be configured dynamically. This is not limited.

One manner is static configuration.

When the static configuration manner is used, a time domain offset of each AP may be predefined. Alternatively, a time offset between collaboration APs may be predefined, and a time domain offset of each collaboration AP is determined based on the time offset.

Based on the static configuration manner, each collaboration AP may obtain a time domain offset of the collaboration AP in advance. After the central AP delivers a synchronization trigger frame to a collaboration AP, the collaboration AP may introduce the time domain offset into a concurrent PPDU frame based on the synchronization trigger frame and a pre-obtained time domain offset.

The other manner is dynamic configuration.

When the dynamic configuration manner is used, time domain offsets may be separately allocated to different collaboration APs according to real-time service requirements. Alternatively, a time offset between collaboration APs may be determined according to real-time service requirements, and a time domain offset is allocated to each collaboration AP based on the time offset.

Based on the dynamic configuration manner, when delivering the synchronization trigger frame, the central AP may send the allocated time domain offset to the collaboration AP. After the central AP delivers the synchronization trigger frame to the collaboration AP, the collaboration AP may introduce the time domain offset into a concurrent PPDU frame based on the synchronization trigger frame and time domain offset information carried in the synchronization trigger frame.

Figure 9:
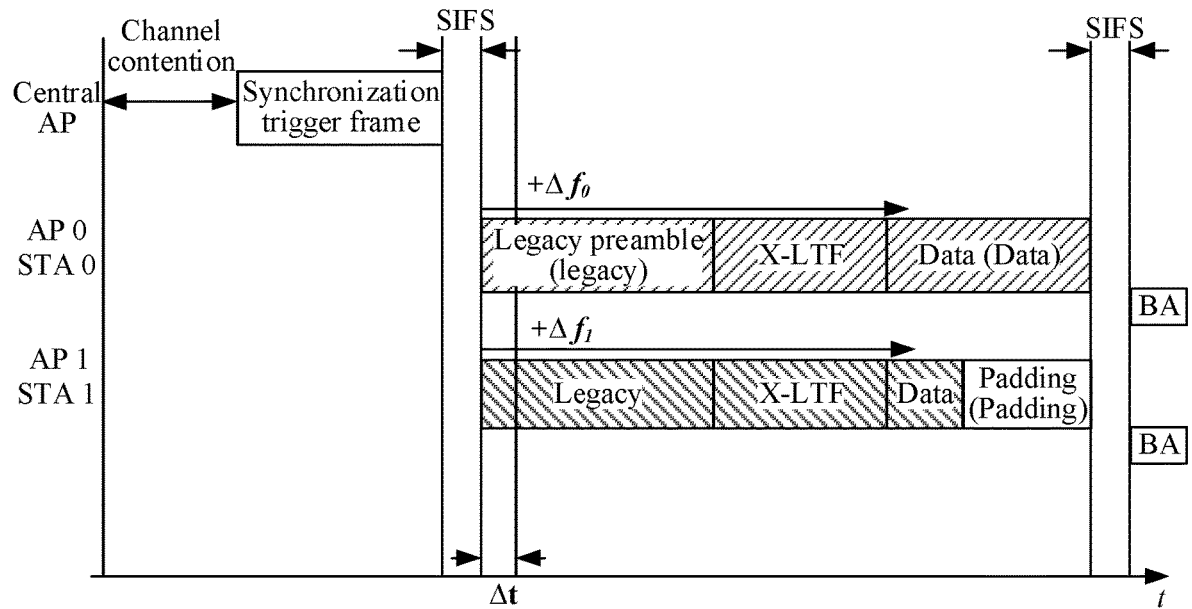
FIG. 9 is a schematic diagram of a scenario in which a central AP controls concurrency of two collaboration APs and applicable to another embodiment of this application.

With reference to FIG. 9, the following describes an example in which an AP 0 and an AP 1 collaborate to concurrently send signals to a STA 0 (where the AP 0 sends a target signal to the STA 0, and the AP 1 sends an interference signal to the STA 0).

The central AP can adjust sending delays of the AP 0 and the AP 1 to implement SDMA concurrency. FIG. 9 is used as an example. It is assumed that a time domain offset of the AP 0 is $\Delta t_0$, and a time domain offset of the AP 1 is $\Delta t_1$. It is assumed that the synchronization trigger frame carries information about the time domain offset.

The central AP delivers the synchronization trigger frame to the AP 0 and the AP 1, and indicates the AP 0 and the AP 1 to send PPDUs at different time intervals. After receiving the synchronization trigger frame, the AP 0 and the AP 1 trigger PPDU concurrency. In addition, based on the information about the time domain offset carried in the synchronization trigger frame, the AP 0 introduces the time domain offset $\Delta t_0$ into the concurrent PPDU frame, and the AP 1 introduces the time domain offset $\Delta t_1$ into the concurrent PPDU frame, so that the time offset of the concurrent PPDU is: $\Delta t = \Delta t_0 - \Delta t_1$.

There is a time offset $\Delta f$ between the target signal received by the STA 0 and the interfering signal. Due to an impact of the time offset, an obvious delay exists between a channel of the interfering signal and a channel of the target signal in time domain. Therefore, the delay may be eliminated through channel estimation noise reduction. Similarly, a smoothing (smoothing) noise reduction manner is equivalent to adding a window in time domain to filter out a signal outside the window.

Figure 10:
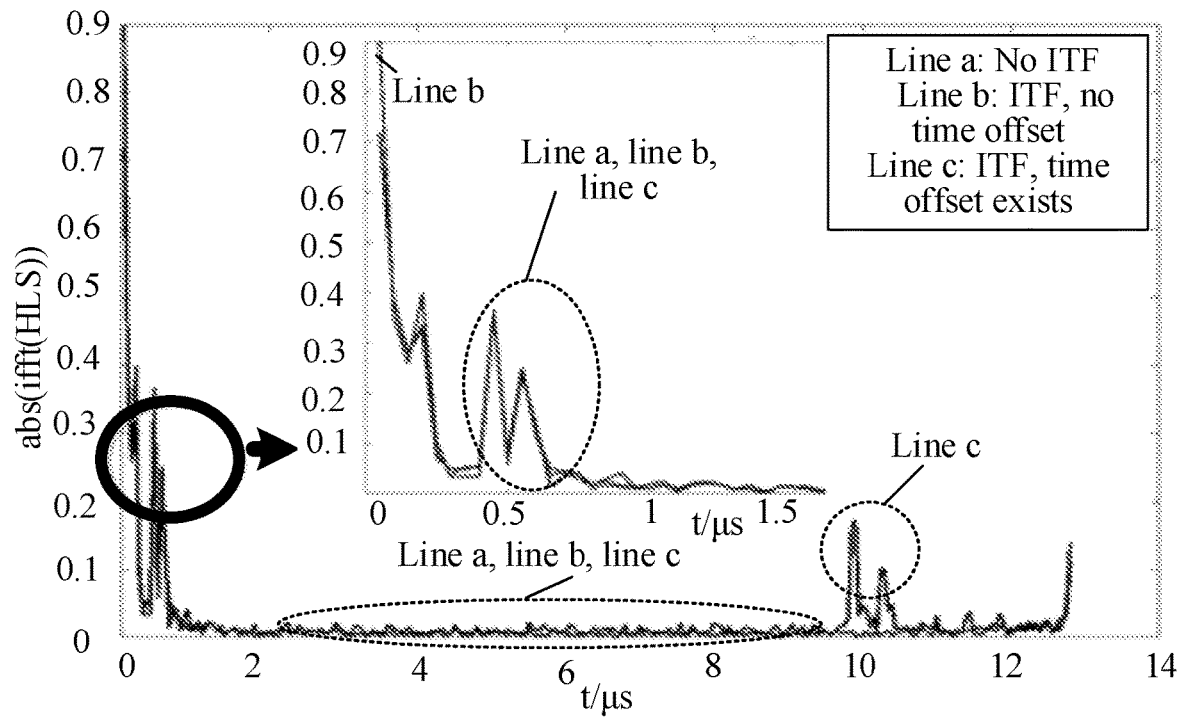
FIG. 10 is a schematic diagram of a time offset applicable to another embodiment of this application.

As shown in FIG. 10, an obvious delay difference occurs between the channel of the target signal and the channel of the interfering signal by introducing the time offset, and then the channel of the interfering signal may be filtered out through channel estimation noise reduction through windowing.

Figure 11:
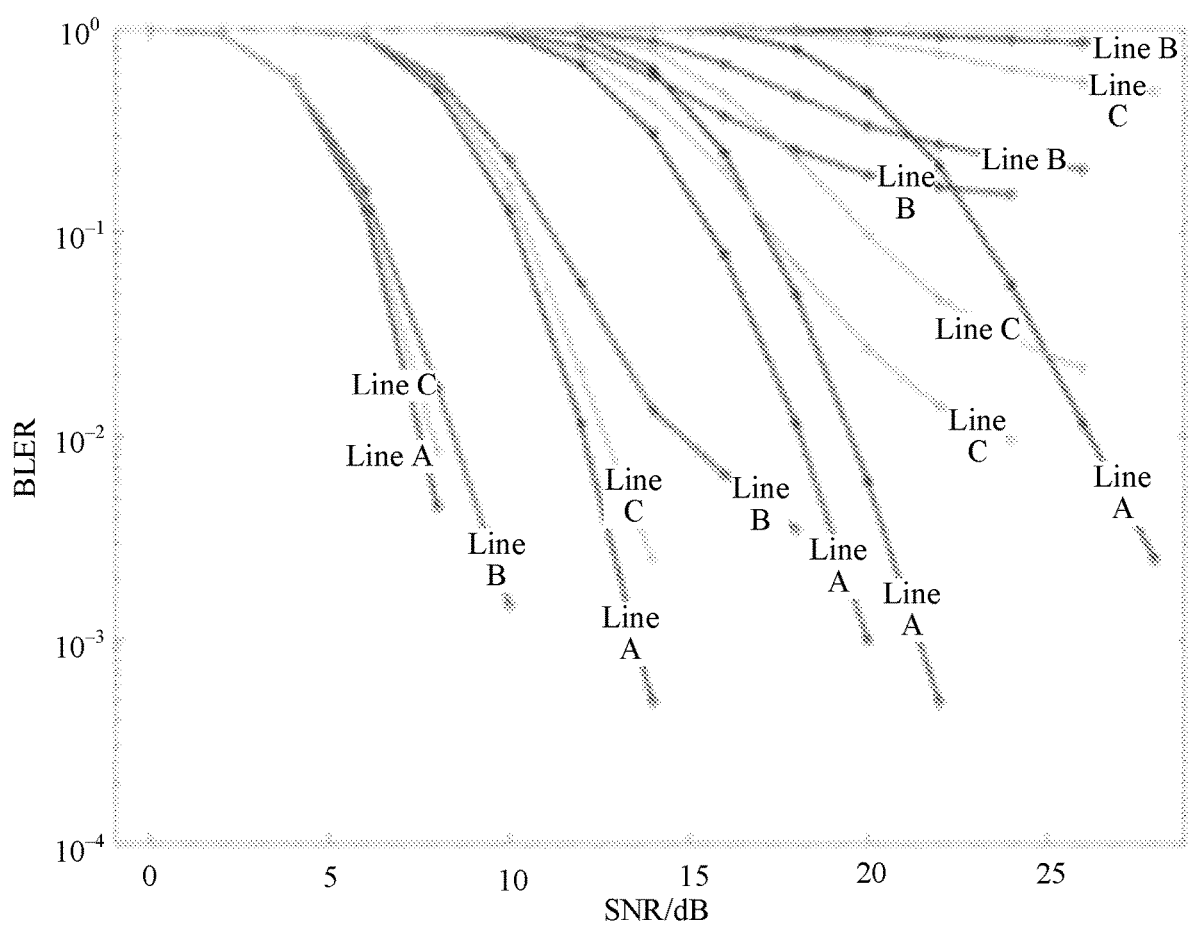
FIG. 11 is a schematic diagram of performance comparison of different time offsets.

FIG. 11 shows demodulation performance in different time offsets. In FIG. 11, a line A indicates demodulation performance without interference, lines B and C indicate that an interfering signal arrives at a same time as a target signal, and a power of the interfering signal is lower than a power of the target signal. For example, the power of the interfering signal is 20 dB lower than the power of the target signal. The line B indicates that a time offset between the interfering signal and the target signal is 0, and the line C indicates that the time offset between the interfering signal and the target signal is 3 µs. It can be learned by comparing the line B with the line C that demodulation performance can be effectively improved by increasing a time offset between signals. For example, an order of an MCS for scheduling can be increased by two, and a throughput rate can be greatly improved.

Based on the foregoing solution 2, the time domain offset is introduced to the collaboration APs, so that there is a time offset between the collaboration APs. For example, through joint scheduling of a central AP, a specific time offset is separately added when transmitting ends of collaboration APs concurrently send signals. Due to an impact of the time offset, an obvious delay exists between a channel of the interfering signal and a channel of the target signal in time domain. Therefore, the delay may be eliminated through channel estimation noise reduction. In addition, as the time offset increases, the demodulation performance and the throughput rate can be improved.

Solution 3: Time domain resources and frequency domain resources sent by a plurality of collaboration APs to a same STA are different. In other words, time domain resources and frequency domain resources sent by a plurality of collaboration APs to a same STA have deviations.

Solution 3 may be understood as a combination of Solution 1 and Solution 2. For example, when the central AP sends a synchronization trigger frame, a low correlation of multi-AP pilot sequences is ensured between the collaboration APs by using a specific frequency offset and a specific time offset. Specifically, reference may be made to the foregoing descriptions of Solution 1 and Solution 2, and details are not described herein again.

In a possible case, when a large quantity of collaboration APs are scheduled to concurrently send signals, $\Delta f < 2f_{Thr}$ is satisfied, and a pilot correlation does not decrease to a threshold, performance can be improved by adding a time offset dimension to some APs.

It should be understood that, when Solution 1 and Solution 2 are used in combination, some APs may use Solution 1, and some APs may use Solution 2. Alternatively, some APs may use both Solution 1 and Solution 2. This is not limited.

For example, three collaboration APs, denoted as an AP 0, an AP 1, and an AP 2, are used as an example. Considering that the central AP schedules three APs to concurrently send signals, the central AP may set a frequency offset for the AP 0 and the AP 1, and set a time offset for the AP 0 and the AP 2. For a PPDU sent by the AP 0, the PPDU is interfered by a PPDU that has a frequency offset and that is concurrently sent by the AP 1 and a PPDU that has a time offset and that is concurrently sent by the AP 2.

Figure 12:
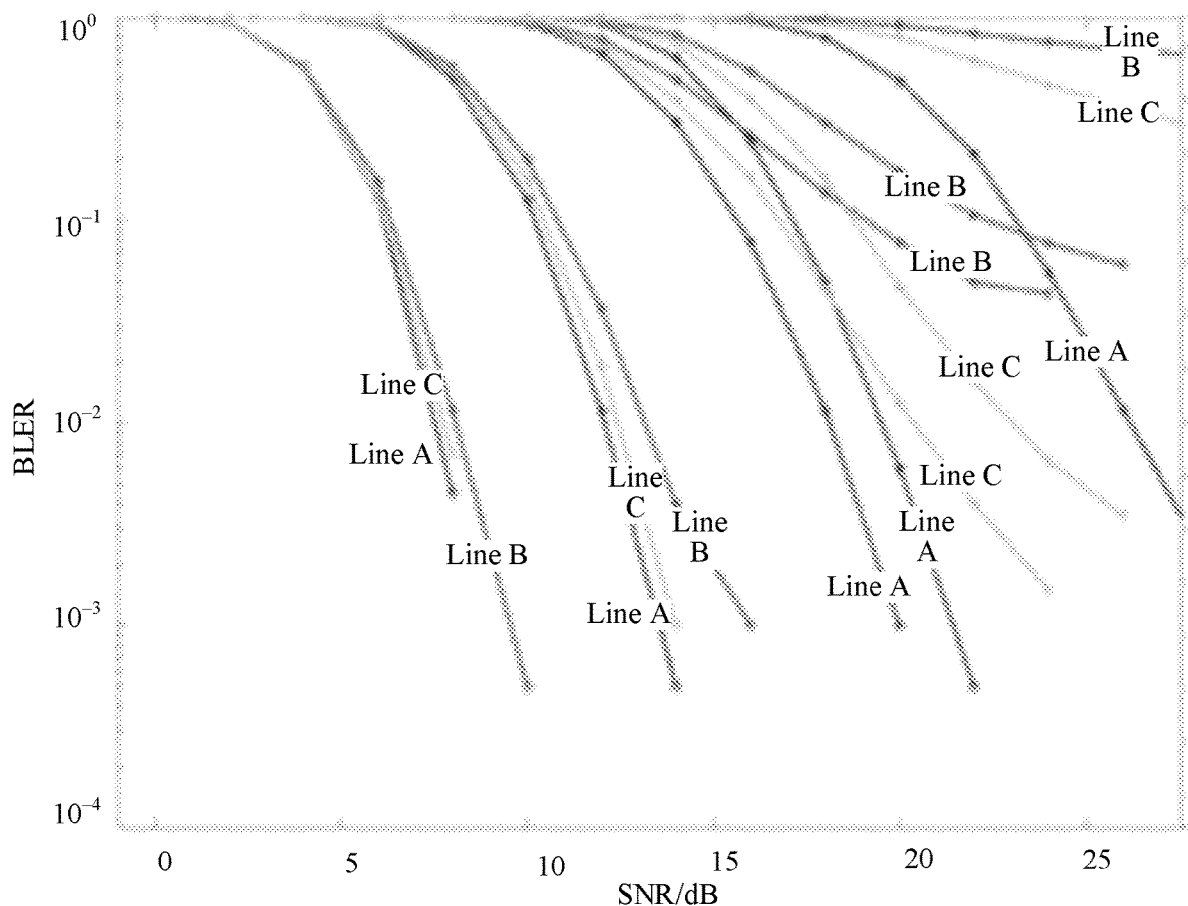
FIG. 12 is a schematic diagram of performance comparison of a scenario in which a central AP controls concurrency of three collaboration APs and applicable to another embodiment of this application.

FIG. 12 shows performance of a PPDU sent by an AP 0. In FIG. 12, a line A indicates demodulation performance without interference, lines B and C indicate that an interfering signal arrives at a same time as a target signal, and a power of the interfering signal is lower than a power of the target signal. For example, the power of the interfering signal is 25 dB lower than the power of the target signal. The line B indicates that there is no time-frequency offset between the AP 0, an AP 1, and an AP 2, and the line C indicates that there is a frequency offset of 232 kHz between the AP 0 and the AP 1, and there is a time offset of 3 μs between the AP 0 and the AP 2. It can be learned by comparing the line B with the line C that demodulation performance can be effectively improved by using the specific frequency offset and time offset. For example, an order of an MCS for scheduling can be increased by two, and a throughput rate can be greatly improved.

It should be understood that the foregoing case in which Solution 1 and Solution 2 are used in combination is merely used as an example for description. There may be a plurality of variations for the case in which Solution 1 and Solution 2 are used in combination. No strict limitation is imposed herein. In a concurrency scenario, both Solution 1 and Solution 2 are applicable to this embodiment of this application.

Based on the foregoing solution 3, a time domain offset and a frequency domain offset are introduced for the collaboration APs, so that there is a time offset and a frequency offset between the collaboration APs. For example, through joint scheduling of the central AP, a specific time offset and a specific frequency offset are separately added when transmitting ends of the collaboration APs concurrently send signals. The demodulation performance and the throughput rate can be improved.

It should be understood that, in some of the foregoing embodiments, the collaboration AP is mainly used as an example for description. No strict limitation is imposed herein. Any device that can support collaboration and concurrency is applicable to embodiments of this application.

It should be understood that, in embodiments of this application, a time offset and/or a frequency offset may be introduced for the collaboration AP, to reduce a pilot correlation of signals sent by a plurality of collaboration APs. However, this imposes no limitation on this application. Any solution that can reduce the pilot correlation of the signals sent by the plurality of collaboration APs falls within the protection scope of embodiments of this application. In a possible design, pilots of signals sent by a plurality of collaboration APs are not the same. For example, X-LTF pilot symbols may be added for signal streams sent by different APs, or pilot sequences of different APs may be modified.

It should be further understood that, in embodiments of this application, when a plurality of collaboration APs collaborate to send signals concurrently, a frequency domain adjustment amount and/or a time domain adjustment amount may be configured for each collaboration AP, or a frequency domain adjustment amount and/or a time domain adjustment amount may be configured for some collaboration APs. This is not limited. Any solution in which there is a frequency offset and/or a time offset between the target signal and the interfering signal is applicable to embodiments of this application.

Based on the foregoing technical solutions, in some concurrency scenarios, for example, a multi-AP concurrency scenario in a Wi-Fi system, configuration of collaboration APs is performed. For example, a specific frequency offset is added separately when the collaboration APs concurrently send signals, or a frequency domain adjustment amount in a specific range used for signal sending is modulated. For another example, a specific time offset is separately added when the collaboration APs concurrently send signals, or a time domain adjustment amount in a specific range used for signal sending is modulated. For another example, both a specific frequency offset and a specific time offset are added when the collaboration APs concurrently send signals, or both a frequency domain adjustment amount and a time domain adjustment amount in a specific range used for signal sending is modulated. Therefore, precision of channel estimation and noise estimation at a receiving end can be improved, so that the demodulation performance at the receiving end and an entire network throughput rate can be improved.

Embodiments described in this specification may be independent solutions, or may be combined based on internal logic. These solutions all fall within the protection scope of this application.

It may be understood that, in the foregoing method embodiments, the methods and the operations implemented by the terminal device may alternatively be implemented by a component (for example, a chip or a circuit) used in the terminal device, and the methods and the operations implemented by the network device may alternatively be implemented by a component (for example, a chip or a circuit) used in the network device.

The methods provided in embodiments of this application are described in detail above with reference to FIG. 3 to FIG. 12. The following describes in detail communication apparatuses provided in embodiments of this application with reference to FIG. 13 to FIG. 16. It should be understood that descriptions of apparatus embodiments correspond to the descriptions of the method embodiments. Therefore, for content that is not described in detail, refer to the foregoing method embodiments. For brevity, details are not described herein again.

The foregoing mainly describes the solutions provided in embodiments of this application from a perspective of interaction between network elements. It may be understood that, to implement the foregoing functions, each network element, for example, a transmitting end device or a receiving end device, includes a corresponding hardware structure and/or software module for performing each function. A person skilled in the art may be aware that, with reference to the examples described in embodiments disclosed in this specification, units and algorithm steps can be implemented by hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it is not considered that the implementation goes beyond the scope of this application.

In embodiments of this application, functional module division may be performed on the transmitting end device or the receiving end device based on the foregoing method example. For example, each functional module may be obtained through division corresponding to each function, or two or more functions may be integrated into one processing module. The integrated module may be implemented in a form of hardware, or may be implemented in a form of a software function module. It should be noted that, in embodiments of this application, division into the modules is an example, and is merely logical function division. During actual implementation, another division manner may be used. An example in which each function module is obtained through division based on each corresponding function is used below for description.

Figure 13:
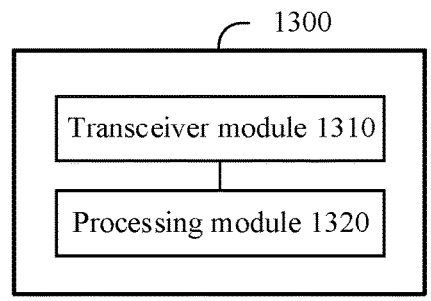
FIG. 13 is a schematic block diagram of a communication apparatus according to an embodiment of this application.

FIG. 13 is a schematic block diagram of a communication apparatus according to an embodiment of this application. The communication apparatus 1300 includes a transceiver module 1310 and a processing module 1320. The transceiver module 1310 may implement a corresponding communication function, and the processing module 1320 is configured to perform data processing. The transceiver module 1310 may also be referred to as a communication interface or a communication module.

Optionally, the communication apparatus 1300 may further include a storage unit. The storage unit may be configured to store instructions and/or data. The processing module 1320 may read the instructions and/or data in the storage unit, so that the communication apparatus implements the foregoing method embodiment.

The communication apparatus 1300 may be configured to perform an action performed by the collaboration device (for example, the collaboration AP) in the foregoing method embodiment. In this case, the communication apparatus 1300 may be a collaboration device or a component that can be configured in the collaboration device. The transceiver module 1310 is configured to perform a transceiver-related operation on the collaboration device side in the foregoing method embodiment, and the processing module 1320 is configured to perform a processing-related operation on the collaboration device side in the foregoing method embodiment.

Alternatively, the communication apparatus 1300 may be configured to perform an action performed by the central device (for example, the central AP) in the foregoing method embodiment. In this case, the communication apparatus 1300 may be a central device or a component that can be configured in the central device. The transceiver module 1310 is configured to perform a transceiver-related operation on the central device side in the foregoing method embodiment, and the processing module 1320 is configured to perform a processing-related operation on the central device side in the foregoing method embodiment.

In a design, the communication apparatus 1300 is configured to perform an action performed by the collaboration device in the foregoing method embodiment, and the transceiver module 1310 is configured to receive a synchronization trigger frame. The processing module 1320 is configured to obtain information about a time domain offset and/or information about a frequency domain offset. The transceiver module 1310 is configured to send a signal based on the synchronization trigger frame and the information about the time domain offset and/or the information about the frequency domain offset.

In an example, the time domain offset or the frequency domain offset is determined based on a quantity of network devices with current concurrent signals and/or a quantity of terminal devices that receive the signals, or the time domain offset or the frequency domain offset is predefined.

In another example, the transceiver module 1310 is further configured to receive information about a frequency offset and/or information about a time offset. The frequency offset indicates a difference in frequency domain of concurrent signals of a plurality of network devices. The time offset indicates a delay difference of the concurrent signals of the plurality of network devices.

In another example, the frequency offset $\Delta f$ satisfies: $\Delta f < N_{co} * f_{Thr}$; and/or $\Delta f > f_{zp}$. The frequency offset $\Delta f$ indicates the difference in frequency domain of the concurrent signals of the plurality of network devices, $f_{Thr}$ indicates a preset frequency offset error threshold, $N_{co}$ indicates the quantity of the network devices with the current concurrent signals, and $f_{zp}$ indicates correlation of pilots of signals sent by the network devices with the current concurrent signals.

The communication apparatus 1300 may implement steps or procedures performed by the collaboration device in the method embodiments in embodiments of this application. The communication apparatus 1300 may include a module configured to perform the method performed by the collaboration device in the method embodiments. In addition, the modules in the communication apparatus 1300 and the foregoing other operations and/or functions are separately used to implement corresponding procedures in the method embodiments.

When the communication apparatus 1300 is configured to perform the method 300 in FIG. 3, the transceiver module 1310 may be configured to perform step 320 in the method 300, and the processing module 1320 may be configured to perform step 310 in the method 300.

It should be understood that a specific process in which each module performs the foregoing corresponding step has been described in detail in the foregoing method embodiment. For brevity, details are not described herein again.

In another design, the communication apparatus 1300 is configured to perform an action performed by the central device in the foregoing method embodiment, and the processing module 1320 is configured to determine a time domain offset and/or a frequency domain offset when signals are concurrently sent by $N_{co}$ network devices, where $N_{co}$ is an integer greater than 1. The transceiver module 1310 is configured to send a synchronization trigger frame and information about the time domain offset and/or information about the frequency domain offset.

In an example, the time domain offset or the frequency domain offset is determined based on $N_{co}$ and/or a quantity of terminal devices that receive concurrent signals of $N_{co}$ network devices, or the time domain offset or the frequency domain offset is predefined.

In another example, the transceiver module 1310 is further configured to send information about a frequency offset and/or information about a time offset. The frequency offset indicates a frequency difference of the concurrent signals of $N_{co}$ network devices. The time offset indicates a delay difference of the concurrent signals of $N_{co}$ network devices.

In still another example, the frequency offset $\Delta f$ satisfies: $\Delta f < N_{co} * f_{Thr}$; and/or $\Delta f > f_{zp}$. The frequency offset indicates the frequency difference of the concurrent signals of $N_{co}$ network devices, $f_{Thr}$ indicates a preset frequency offset error threshold, and $f_{zp}$ indicates correlation of pilots of signals sent by $N_{co}$ network devices.

The communication apparatus 1300 may implement steps or procedures performed by the central device in the method embodiments in embodiments of this application. The communication apparatus 1300 may include a module configured to perform the method performed by the central device in the method embodiments. In addition, the modules in the communication apparatus 1300 and the foregoing other operations and/or functions are separately used to implement corresponding procedures in the method embodiments.

When the communication apparatus 1300 is configured to perform the method 300 in FIG. 3, the transceiver module 1310 may be configured to perform step 320 in the method 300, and the processing module 1320 may be configured to perform step 310 in the method 300.

It should be understood that a specific process in which each module performs the foregoing corresponding step has been described in detail in the foregoing method embodiment. For brevity, details are not described herein again.

In another design, the communication apparatus 1300 is configured to perform an action performed by the terminal device in the foregoing method embodiment. The transceiver module 1310 is configured to receive concurrent signals of $N_{co}$ network devices on different time domain resources and/or different frequency domain resources, where $N_{co}$ is an integer greater than 1. The processing module 1320 is configured to determine, based on the different time domain resources and/or the different frequency domain resources, a signal sent by a target network device in $N_{co}$ network devices.

In an example, a frequency offset $\Delta f$ satisfies: $\Delta f < N_{co} * f_{Thr}$; and/or $\Delta f > f_{zp}$. The frequency offset indicates a frequency difference of the concurrent signals of $N_{co}$ network devices, $f_{Thr}$ indicates a preset frequency offset error threshold, and $f_{zp}$ indicates correlation of pilots of signals sent by $N_{co}$ network devices.

The communication apparatus 1300 may implement steps or procedures performed by the terminal device in the method embodiments in embodiments of this application. The communication apparatus 1300 may include a module configured to perform the method performed by the terminal device in the method embodiments. In addition, the modules in the communication apparatus 1300 and the foregoing other operations and/or functions are separately used to implement corresponding procedures in the method embodiments.

It should be understood that a specific process in which each module performs the foregoing corresponding step has been described in detail in the foregoing method embodiment. For brevity, details are not described herein again.

The processing module 1320 in the foregoing embodiment may be implemented by at least one processor or a processor-related circuit. The transceiver module 1310 may be implemented by a transceiver or a transceiver-related circuit. The storage unit may be implemented by using at least one memory.

Figure 14:
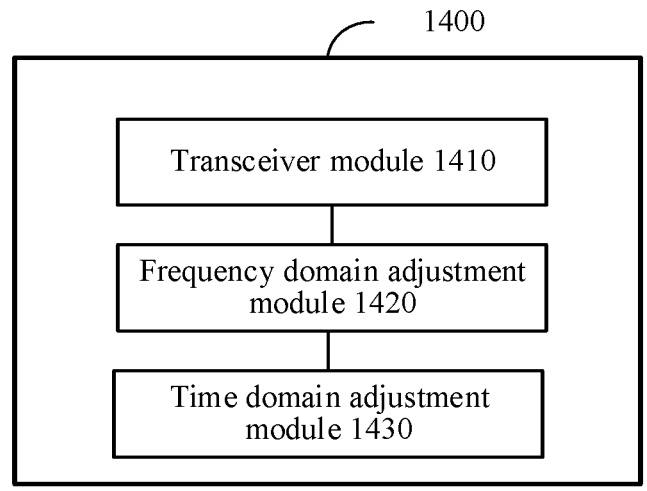
FIG. 14 is a schematic block diagram of a collaboration device according to an embodiment of this application.

FIG. 14 is a schematic block diagram of a collaboration device (for example, a collaboration AP) according to an embodiment of this application. The collaboration device 1400 may be a collaboration device or may be a chip. The collaboration device 1400 may be configured to perform an operation performed by the collaboration device in the foregoing method embodiment. The collaboration device 1400 may include a frequency domain adjustment module 1420 and/or a time domain adjustment module 1430.

The frequency domain adjustment module 1420 represents a frequency domain adjustment functional module or a frequency offset pre-adjustment functional module of a transmit link in the collaboration AP. The frequency domain adjustment module 1420 supports an interface for MAC delivery.

The time domain adjustment module 1430 represents a time domain adjustment functional module or a delay pre-adjustment functional module of the transmit link in the collaboration AP. The time domain adjustment module 1430 supports the interface for MAC delivery.

As an example but not a limitation, the frequency domain adjustment module 1420 and the time domain adjustment module 1430 may be two separate modules, or may be integrated into one module (for example, a processing module). This is not limited.

Optionally, the collaboration device 1400 may further include a transceiver module 1410. The transceiver module 1410 may implement a corresponding communication function. The transceiver module 1410 may also be referred to as a communication interface or a communication module.

Optionally, the collaboration device 1400 may further include a storage module. The storage module may be configured to store instructions and/or data. The frequency domain adjustment module 1420 and the time domain adjustment module 1430 may read the instructions and/or data in the storage unit, so that the collaboration device 1400 implements the foregoing method embodiment.

The collaboration device 1400 may be configured to perform an action performed by the collaboration AP in the foregoing method embodiment. In this case, the collaboration device 1400 may be an AP or a component that can be configured in the AP. The transceiver module 1410 is configured to perform a transceiver-related operation on the collaboration AP side in the foregoing method embodiment. The frequency domain adjustment module 1420 is configured to perform an operation related to adjusting frequency domain for signal sending on the collaboration AP side in the foregoing method embodiment, and the time domain adjustment module 1430 is configured to perform an operation related to adjusting time domain for signal sending on the collaboration AP side in the foregoing method embodiment.

For example, in an implementation, the frequency domain adjustment module 1420 is configured to perform a processing action of the collaboration AP based on the frequency domain offset adjustment in Solution 1. For another example, in an implementation, the time domain adjustment module 1430 is configured to perform a processing action of the collaboration AP based on the time domain offset adjustment in Solution 2.

Figure 15:
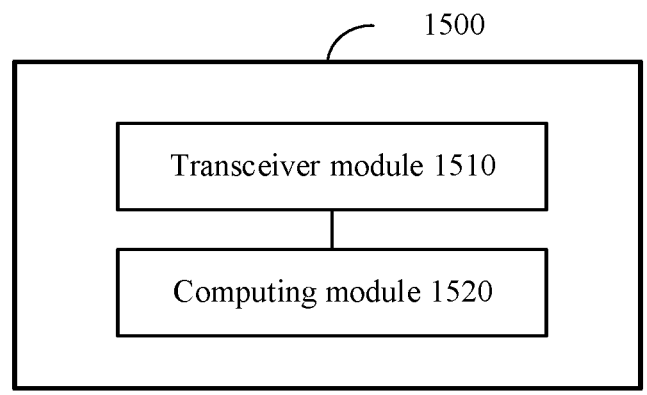
FIG. 15 is a schematic block diagram of a central device according to an embodiment of this application.

FIG. 15 is a schematic block diagram of a central device (for example, a central AP) according to an embodiment of this application. The central device 1500 may be a central device, a chip, or a virtual entity. The central device 1500 may be configured to perform an operation performed by the central device in the foregoing method embodiment. The central device 1500 may include a transceiver module 1510 and a computing module 1520. The transceiver module 1510 may implement a corresponding communication function. The transceiver module 1410 may also be referred to as a communication interface or a communication module. The computing module 1520 may be configured to process a calculation-related operation.

Optionally, the central device 1500 may further include a storage module. The storage module may be configured to store instructions and/or data. The computing module 1520 may read the instructions and/or data in the storage module, so that the central device 1500 implements the foregoing method embodiment.

The central device 1500 may be configured to perform an action performed by the central AP in the foregoing method embodiment. In this case, the central device 1500 may be an AP or a component that can be configured in the AP. The transceiver module 1510 is configured to perform a transceiver-related operation on the central AP side in the foregoing method embodiment. The computing module 1520 is configured to perform a calculation-related operation on the central AP side in the foregoing method embodiment, for example, may be configured to calculate a frequency offset and a frequency domain offset between different collaboration APs.

Figure 16:
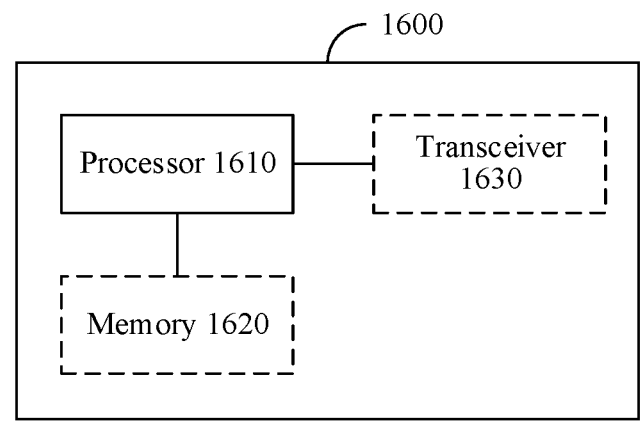
FIG. 16 is a schematic diagram of a structure of a communication apparatus according to an embodiment of this application.

As shown in FIG. 16, an embodiment of this application further provides a communication apparatus 1600. The communication apparatus 1600 includes a processor 1610. The processor 1610 is coupled to a memory 1620. The memory 1620 is configured to store a computer program or instructions and/or data. The processor 1610 is configured to execute the computer program or the instructions and/or data stored in the memory 1620, so that the method in the foregoing method embodiment is performed.

Optionally, the communication apparatus 1600 includes one or more processors 1610.

Optionally, as shown in FIG. 16, the communication apparatus 1600 may further include the memory 1620.

Optionally, the communication apparatus 1600 may include one or more memories 1620.

Optionally, the memory 1620 and the processor 1610 may be integrated together, or disposed separately.

Optionally, as shown in FIG. 16, the communication apparatus 1600 may further include a transceiver 1630, and the transceiver 1630 is configured to receive and/or send a signal. For example, the processor 1610 is configured to control the transceiver 1630 to receive and/or send a signal.

In a solution, the communication apparatus 1600 is configured to implement an operation performed by the collaboration device (for example, the collaboration AP) in the foregoing method embodiment.

For example, the processor 1610 is configured to implement a processing-related operation performed by the collaboration AP in the foregoing method embodiment, and the transceiver 1630 is configured to implement a transceiver-related operation performed by the collaboration AP in the foregoing method embodiment.

In another solution, the communication apparatus 1600 is configured to implement an operation performed by the central device (for example, the central AP) in the foregoing method embodiment.

For example, the processor 1610 is configured to implement a processing-related operation performed by the central AP in the foregoing method embodiment, and the transceiver 1630 is configured to implement a transceiver-related operation performed by the central AP in the foregoing method embodiment.

In still another solution, the communication apparatus 1600 is configured to implement an operation performed by the terminal device in the foregoing method embodiment.

For example, the processor 1610 is configured to implement a processing-related operation performed by the terminal device in the foregoing method embodiment, and the transceiver 1630 is configured to implement a transceiver-related operation performed by the terminal device in the foregoing method embodiment.

An embodiment of this application further provides a computer-readable storage medium, and the computer-readable storage medium stores computer instructions for implementing the method performed by the collaboration device (for example, the collaboration AP) in the foregoing method embodiment.

For example, when the computer program is executed by a computer, the computer is enabled to implement the method performed by the collaboration device (for example, the collaboration AP) in the foregoing method embodiment.

An embodiment of this application further provides a computer-readable storage medium, and the computer-readable storage medium stores computer instructions for implementing the method performed by the central device (for example, the central AP) in the foregoing method embodiment.

For example, when the computer program is executed by a computer, the computer is enabled to implement the method performed by the central device (for example, the central AP) in the foregoing method embodiment.

An embodiment of this application further provides a computer-readable storage medium, and the computer-readable storage medium stores computer instructions for implementing the method performed by the terminal device in the foregoing method embodiment.

An embodiment of this application further provides a computer program product including instructions. When the instructions are executed by a computer, the computer is enabled to implement the method performed by the collaboration device (for example, the collaboration AP) in the foregoing method embodiment.

An embodiment of this application further provides a computer program product including instructions. When the instructions are executed by a computer, the computer is enabled to implement the method performed by the central device (for example, the central AP) in the foregoing method embodiment.

An embodiment of this application further provides a computer program product including instructions. When the instructions are executed by a computer, the computer is enabled to implement the method performed by the terminal device in the foregoing method embodiment.

An embodiment of this application further provides a communication system. The communication system includes the central device (for example, the central AP) and the collaboration device (for example, the collaboration AP) in the foregoing embodiment. Alternatively, the communication system includes the central device (for example, the central AP), the collaboration device (for example, the collaboration AP), and the terminal device in the foregoing embodiment.

It may be clearly understood by a person skilled in the art that, for convenience and brief description, for explanations and beneficial effects of related content of any communication apparatus provided above, refer to the corresponding method embodiment provided above. Details are not described herein again.

In embodiments of this application, the terminal device or the network device may include a hardware layer, an operating system layer running above the hardware layer, and an application layer running above the operating system layer. The hardware layer may include hardware such as a central processing unit (CPU), a memory management unit (MMU), and a memory (also referred to as a main memory). An operating system at the operating system layer may be any one or more computer operating systems that implement service processing by using a process (process), for example, a Linux operating system, a Unix operating system, an Android operating system, an iOS operating system, or a Windows operating system. The application layer may include applications such as a browser, an address book, word processing software, and instant messaging software.

In embodiments of this application, a specific structure of an execution body of the method provided in embodiments of this application is not specially limited, provided that a program that records code for the method provided in embodiments of this application can be run to perform communication according to the method provided in embodiments of this application. For example, the method provided in embodiments of this application may be performed by a device (for example, the AP device or the STA device), or a function module of the device (for example, the AP device or the STA device) that can invoke and execute the program.

Aspects or features of this application may be implemented as a method, an apparatus, or a product that uses standard programming and/or engineering technologies. The term "product" used in this specification may cover a computer program that can be accessed from any computer-readable component, carrier or medium.

The computer-readable storage medium may be any usable medium accessible by a computer, or a data storage device, such as a server or a data center, integrating one or more usable media. The usable medium (or the computer-readable medium) may include, for example, but is not limited to, various media that can store program code such as a magnetic medium or a magnetic storage device (for example, a floppy disk, a hard disk (for example, a removable hard disk), or a magnetic tape), an optical medium (for example, an optical disc, a compact disc (CD), or a digital versatile disc (DVD)), a smart card, and a flash memory device (for example, an erasable programmable read-only memory (EPROM), a card, a stick, or a key drive), or a semiconductor medium (for example, a solid-state drive (SSD)), a USB flash drive, a read-only memory (ROM), or a random access memory (RAM).

Various storage media described in this specification may indicate one or more devices and/or other machine-readable media that are configured to store information. The term "machine-readable media" may include but is not limited to a radio channel and various other media that can store, include, and/or carry instructions and/or data.

It should be understood that, the processor mentioned in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be further understood that the memory mentioned in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM). For example, the RAM may be used as an external cache. By way of example and not limitation, the RAM may include the following plurality of forms: a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM).

It should be noted that when the processor is a general-purpose processor, a DSP, an ASIC, an FPGA or another programmable logic device, a discrete gate or a transistor logic device, or a discrete hardware component, the memory (storage module) may be integrated into the processor.

It should further be noted that the memory described in this specification is intended to include, but is not limited to, these memories and any other memory of a suitable type.

In the several embodiments provided in this application, it should be understood that the disclosed apparatus and method may be implemented in other manners. For example, the foregoing apparatus embodiments are merely examples. For example, division into the foregoing units is only logical function division, and may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The foregoing units described as separate parts may or may not be physically separate, and parts displayed as units may or may not be physical units, may be located in one position, or may be distributed on a plurality of network units. Some or all of the units may be selected based on actual requirements to implement the solutions provided in this application.

In addition, functional units in embodiments of this application may be integrated into one unit, each of the units may exist alone physically, or two or more units may be integrated into one unit.

All or some of the foregoing embodiments may be implemented by using software, hardware, firmware, or any combination thereof.

When software is used to implement embodiments, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. For example, the computer may be a personal computer, a server, a network device, or the like. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. For the computer-readable storage medium, refer to the foregoing description.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims and this specification.

What is claimed is:

1. A signal transmission method, comprising:
receiving a synchronization trigger frame;
obtaining information, the information being about a time domain or frequency domain offset; and
sending a signal based on the synchronization trigger frame and the information about the time domain or frequency domain offset,
wherein the time domain or frequency domain offset comprises the frequency domain offset, and the frequency domain offset $\Delta f$ satisfies:

$\Delta f < N_{co} * f_{Thr}$; or $\Delta f > f_{zp}$, wherein the frequency domain offset $\Delta f$ indicates the difference in frequency domain of the concurrent signals of two network devices, $f_{Thr}$ indicates a preset frequency offset error threshold, $N_{co}$ indicates the quantity of the network devices with the current concurrent signals, and $f_{zp}$ indicates correlation of pilots of signals sent by the network devices with the current concurrent signals.

2. The method according to claim 1, wherein
the time domain or frequency domain offset is determined based on a quantity of network devices with current concurrent signals or a quantity of terminal devices that receive the signals; or
the time domain or frequency domain offset is predefined.

3. The method according to claim 1, wherein the method further comprises:
receiving information about the frequency domain or time domain offset, wherein
the frequency offset indicates a difference in frequency domain of concurrent signals of a plurality of network devices, and the time offset indicates a delay difference of the concurrent signals of the plurality of network devices.

4. A signal transmission method, comprising:
determining a time domain or a frequency domain offset when signals are concurrently sent by $N_{co}$ network devices, wherein $N_{co}$ is an integer greater than 1; and
sending a synchronization trigger frame and information about the time domain or the frequency domain offset, wherein the time domain or frequency domain offset comprises the frequency domain offset, and the frequency domain offset $\Delta f$ satisfies:

$\Delta f < N_{co} * f_{Thr}$; or $\Delta f > f_{zp}$, wherein the frequency domain offset $\Delta f$ indicates the difference in frequency domain of the concurrent signals of two network devices, $f_{Thr}$ indicates a preset frequency offset error threshold, $N_{co}$ indicates the quantity of the network devices with the current concurrent signals, and $f_{zp}$ indicates correlation of pilots of signals sent by the network devices with the current concurrent signals.

5. The method according to claim 4, wherein
the time domain or frequency domain offset is determined based on $N_{co}$ or a quantity of terminal devices that receive concurrent signals of $N_{co}$ network devices; or
the time domain or frequency domain offset is predefined.

6. The method according to claim 4, wherein:
the frequency offset indicates a frequency difference of the concurrent signals of $N_{co}$ network devices, and the time offset indicates a delay difference of the concurrent signals of $N_{co}$ network devices.

7. An apparatus comprising:
at least one processor, and at least one memory storing instructions for execution by the at least one processor;
wherein, when executed, the instructions cause the apparatus to perform operations comprising:
receiving a synchronization trigger frame;
obtaining information, the information being about a time domain or frequency domain offset; and
sending a signal based on the synchronization trigger frame and the information about the time domain or the frequency domain offset,
wherein a frequency domain offset $\Delta f$ satisfies:

$\Delta f < N_{co} * f_{Thr}$; or $\Delta f > f_{zp}$, wherein the frequency domain offset $\Delta f$ indicates the difference in frequency domain of the concurrent signals of two network devices, $f_{Thr}$ indicates a preset frequency offset error threshold, $N_{co}$ indicates the quantity of the network devices with the current concurrent signals, and $f_{zp}$ indicates correlation of pilots of signals sent by the network devices with the current concurrent signals.

8. The apparatus according to claim 7, wherein
when executed, the instructions cause the apparatus to determine the time domain or frequency domain offset based on a quantity of network devices with current concurrent signals or a quantity of terminal devices that receive the signals; or
the time domain or frequency domain offset is predefined within the apparatus.

9. The apparatus according to claim 7, wherein, when executed, the instructions cause the apparatus to perform operations comprising:
receiving information about the frequency domain or time domain offset, wherein
the frequency offset indicates a difference in frequency domain of concurrent signals of a plurality of network devices, and the time offset indicates a delay difference of the concurrent signals of the plurality of network devices.

* * * * *